(12) United States Patent
Furuyama et al.

(10) Patent No.: US 7,232,061 B2
(45) Date of Patent: Jun. 19, 2007

(54) PORTABLE DEVICE, IC MODULE, IC CARD, AND METHOD FOR USING SERVICES

(75) Inventors: Junko Furuyama, Setagaya-ku (JP); Yoshiaki Nakanishi, Ota-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 374 days.

(21) Appl. No.: 10/898,176

(22) Filed: Jul. 26, 2004

(65) Prior Publication Data

US 2005/0023345 A1 Feb. 3, 2005

(30) Foreign Application Priority Data

Jul. 31, 2003 (JP) ............... 2003-283931
Jul. 31, 2003 (JP) ............... 2003-283983

(51) Int. Cl.
*G06F 5/00* (2006.01)
*G06K 5/00* (2006.01)
*G06K 7/01* (2006.01)
*G06K 19/06* (2006.01)

(52) U.S. Cl. .............. 235/380; 235/382; 235/492

(58) Field of Classification Search ............ 235/382.5, 235/382; 902/25, 26, 37, 39
See application file for complete search history.

(56) References Cited

U.S. PATENT DOCUMENTS

| | | | |
|---|---|---|---|
| 6,223,984 B1 * | 5/2001 | Renner et al. ............... 235/380 |
| 6,902,115 B2 * | 6/2005 | Graf et al. ................... 235/380 |
| 2002/0019806 A1 | 2/2002 | Tamura | |
| 2003/0119554 A1 | 6/2003 | Horn | |
| 2005/0258237 A1 * | 11/2005 | Urakami et al. ............. 235/380 |
| 2006/0020558 A1 * | 1/2006 | Bonalle et al. ................ 705/64 |

FOREIGN PATENT DOCUMENTS

| | | |
|---|---|---|
| EP | 0 838 789 | 4/1998 |
| EP | 1 074 951 | 2/2001 |
| EP | 1 117 062 | 7/2001 |
| EP | 1 156 442 | 11/2001 |
| JP | 5-210771 | 8/1993 |
| JP | 9-62810 | 3/1997 |
| JP | 10-105808 | 4/1998 |
| JP | 2000-184087 | 6/2000 |
| JP | 2001-101377 | 4/2001 |
| JP | 2001-118042 | 4/2001 |
| JP | 2002/24722 | 1/2002 |
| JP | 2002-123685 | 4/2002 |
| JP | 2002-298169 | 10/2002 |
| JP | 2003-76958 | 3/2003 |
| JP | 2003-125043 | 4/2003 |
| WO | 03/032214 | 4/2003 |

* cited by examiner

*Primary Examiner*—Jared J. Fureman
(74) *Attorney, Agent, or Firm*—Wenderoth, Lind & Ponack, L.L.P.

(57) ABSTRACT

An IC module (secure element with an IC card function) mounted on a portable device executes a process relating to a service, via contactless communication with a service terminal located at a certain place. At least one of the IC module and the portable device judges whether a change, made in state data related to the service and made by the process with a user's check eliminated, satisfies a condition set as requiring an attraction of a user's attention. According to the result of the judgment, a user interface function of the portable device notifies a user.

9 Claims, 16 Drawing Sheets

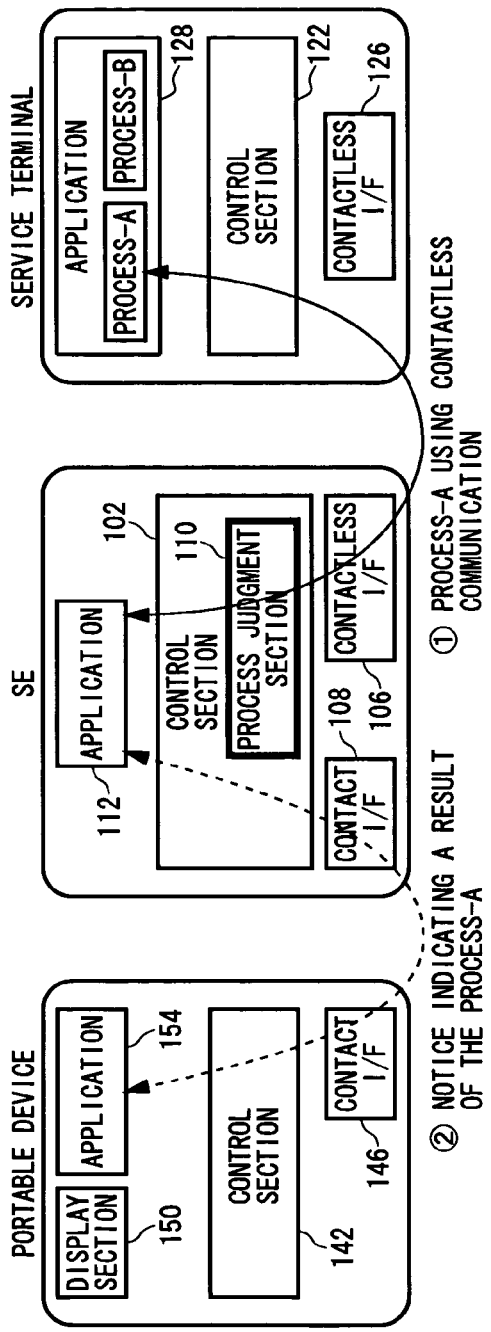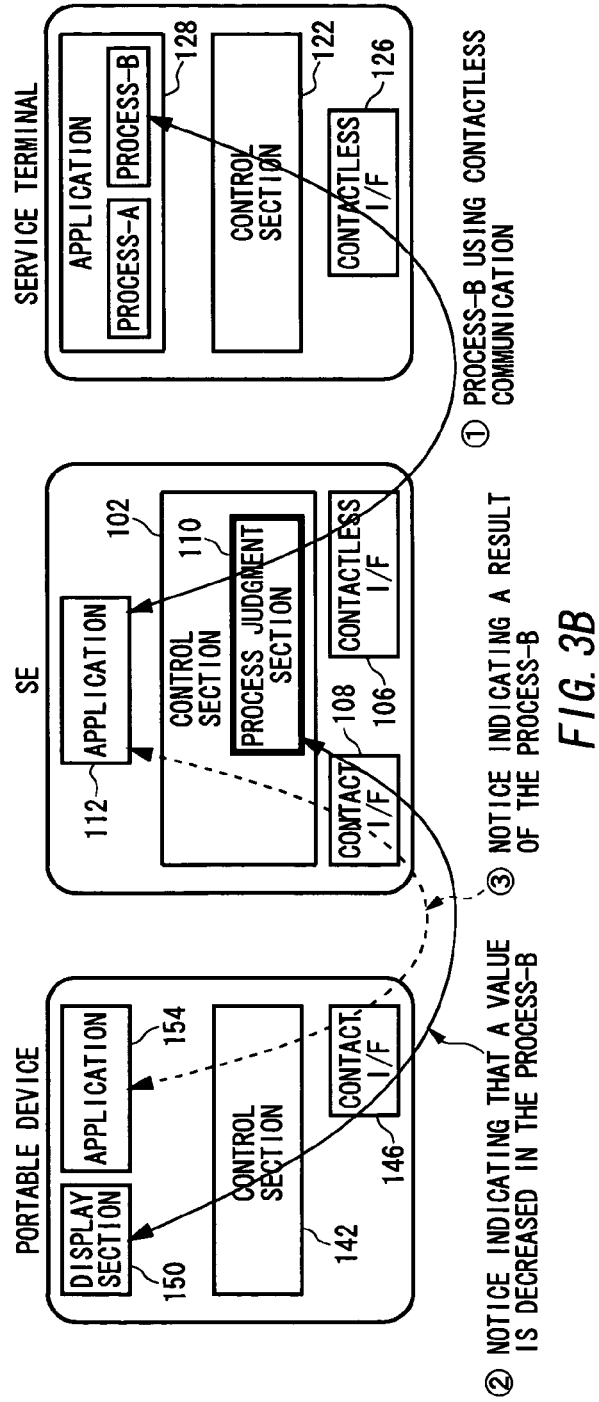

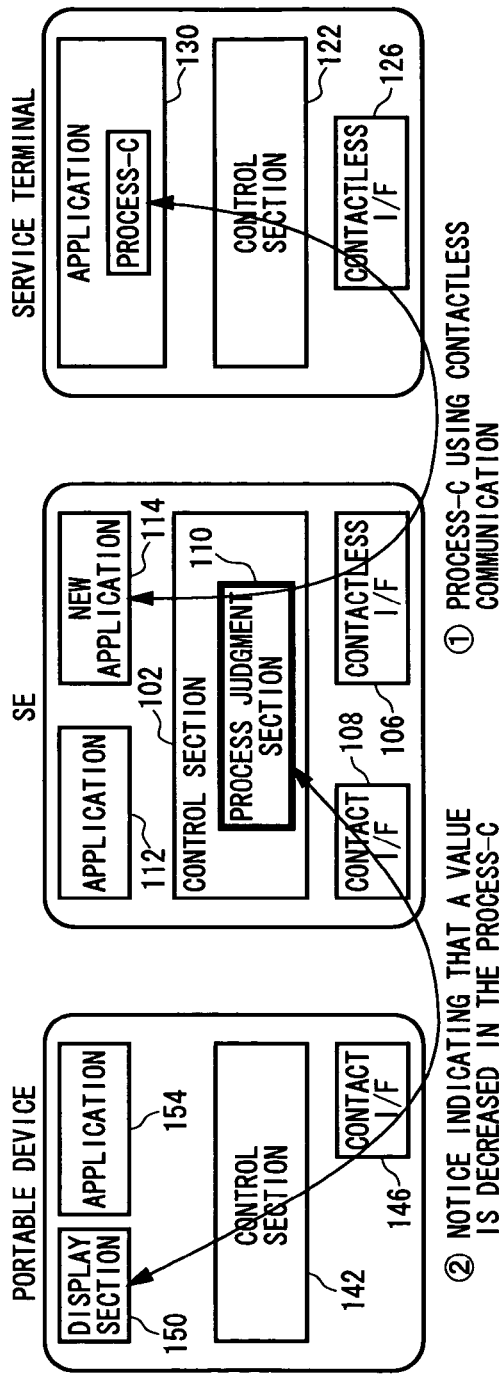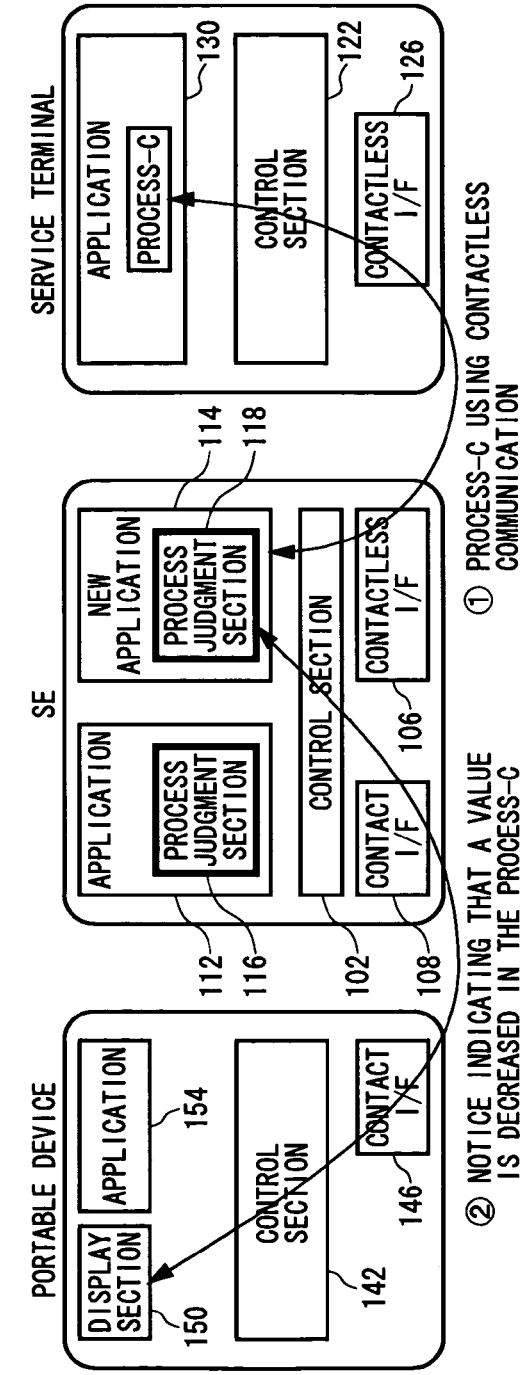

| TICKET GATE APPLICATION (RAILROAD-A) | |
|---|---|
| ENTRY | 100 YEN |
| EXIT | 150 YEN |
| TICKET GATE APPLICATION (RAILROAD-B) | |
| ENTRY | 120 YEN |
| EXIT | 200 YEN |
| PAYMENT APPLICATION | 500 YEN |
| FARE ADJUSTMENT | |

FIG. 7A

| AVERAGE CONSUMPTION VALUE | | | | |
|---|---|---|---|---|
| | 6-12 | 12-17 | 17-24 | |
| MON | 200 YEN | 450 YEN | 150 YEN | ... |
| TUE | 140 YEN | 0 YEN | 270 YEN | |
| ... | | | ... | |
| FREQUENTLY BOARDING/DEBOARDING SECTION | | | | |
| 1 | SHINJUKU – SHIBUYA | | 200 YEN | |
| 2 | KAWASAKI – SHINAGAWA | | 300 YEN | |
| ... | ... | | | |
| COMMUTER PASS INFORMATION | | | | |
| 1/1~6/30 | TOKYO – SHINAGAWA | | | |

FIG. 7B

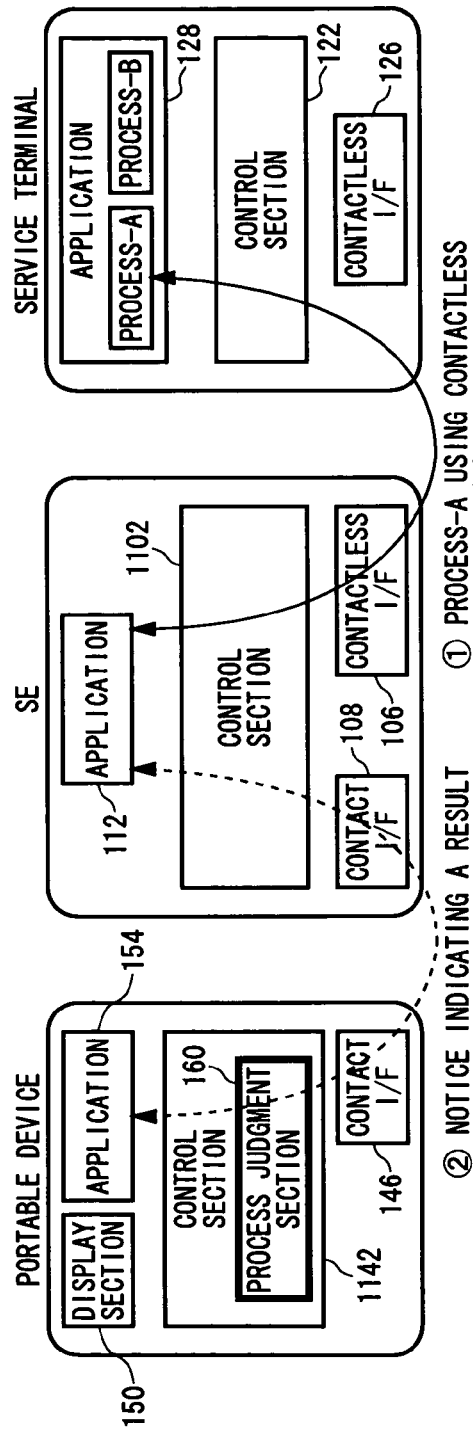
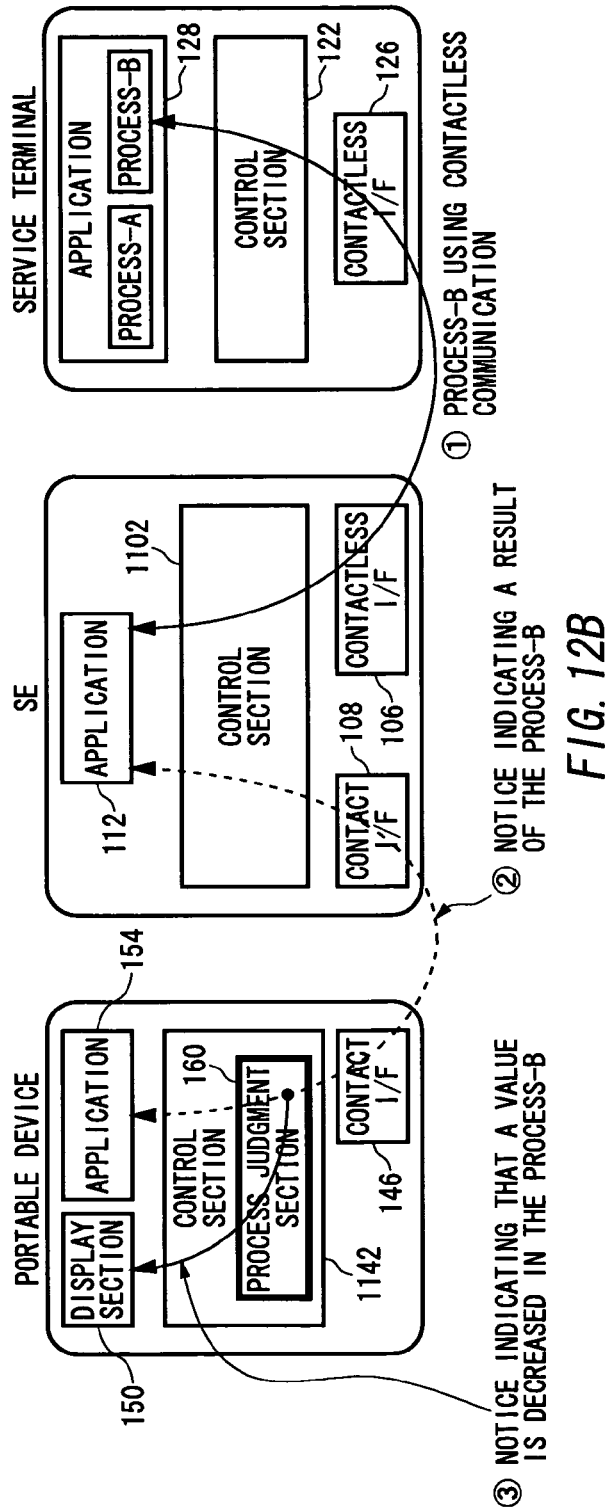

PORTABLE DEVICE, IC MODULE, IC CARD, AND METHOD FOR USING SERVICES

BACKGROUND OF THE INVENTION

1. Field of the Invention

The present invention relates to an art which provides various services using a portable device (cell phone, PDA, or the like) by attaching an IC card including an IC module to the portable device or by allowing the portable device to incorporate an IC module that realizes an IC card function. Here, an IC module is a module that is composed of one or a plurality of IC chips. The IC module comprises a processor and a memory and realizes a certain function by the processor executing a program stored in the memory, but is not limited to any specific structure.

2. Background

Recently, an art that allows providing various services via contactless communication using an IC card is under study. In such an art, a service terminal comprising an IC card reader/writer is located at a certain place like vending machines, check-out counters at stores or the like, entrances and exits of transportation facilities such as ticket gates at stations, entrances and exits of event venues such as concerts, gates of offices and factories, or the like. And then, the service terminal does contactless communication with the IC card put over by a user so as to provide a service such as e-money transactions, bonus point services accompanying purchase of products or the like, fare adjustment at transportation facilities, entry processes by e-ticket, management of entry/exit or attendance record, or various other services.

An IC module mounted on an IC card comprises a processor such as CPU or MPU that executes logical operation and arithmetic operation and a memory such as ROM, RAM, or EEPROM that stores programs and data. And an IC card for contactless communication further comprises a contactless communication interface that enables contactless communication with a reader/writer. The IC module for the IC card is configured such that programs and important data are concealed in an IC chip and important information as well as a key or logic to access that information cannot be seen by an unauthorized device. Therefore, the IC module can store important information and can process cryptography inside the module.

And recently, a memory mounted on an IC card is becoming larger in capacity and can store a plurality of applications at the same time, so that a user can use a plurality of services with just one IC card. In this way, for example, if two or more applications such as a pre-paid train ticket to get on and off a certain train and an e-ticket to enter a certain concert venue are stored in one IC card, a user can use various services with that one IC card without bothering to pull out different IC cards for each service.

Furthermore, by including a contact communication interface to connect with an external device in addition to a contactless communication interface with a reader/writer, an IC card mounted with an IC module can be used connected with a portable device such as a cell phone, PDA, or the like. Such a portable device connected with an IC card becomes a portable device mounted with an IC module. Alternatively, by incorporating an IC module itself into a portable device (In this case, too, an IC module and other parts of the portable device can be regarded as being connected with each other via a contact communication interface), a portable device mounted with an IC module can be realized.

Japanese published patent application No. 2003-125043 discloses an art to use various e-commerce services using a cell phone mounted with an e-commerce module. Particularly, it describes as follows about a request for a user to input a password with a keypad of the cell phone during the dealing. In the art, a user is allowed to change the setting of whether an input of a password is required or not so that an input of a password is required when the cell phone mounted with the e-commerce module is used as an e-money during shopping, but an input of a password is not required when it is used as a commuter pass to go to office (or school) at a ticket gate of a station. In addition, when it is set not to require an input of a password, lighting an indicating lamp of the cell phone allows a user to recognize the setting status.

Here, one of the great advantages of a contactless type IC card is that it allows an execution of a process by simply touching and going ("touch and go") through the service terminal. Therefore, it is highly likely that many password-free applications will also be used for a portable device mounted with a contactless type IC module.

However, in the above-mentioned art of Japanese published patent application No. 2003-125043, a user can know by an indication lamp lighting that the setting is set as password-free, but he/she can never know what kind of process was actually executed when he/she used a password-free service. There is a possibility that a service terminal display would show the details and result of the process. However, when a speed of the "touch and go" process is required, a user will have difficulty in reading information on the display accurately as he/she passes by the service terminal by putting an IC-module-mounted portable device over the reader/writer.

SUMMARY OF THE INVENTION

Methods and systems consistent with the invention provides a system that gives an appropriate notice to a user regarding a process executed by an IC module mounted on a portable device, via contactless communication with a service terminal, using a user interface function such as a display of the portable device which is connected with the IC module via a contact communication interface.

In such situation, if details and results of all the password-free processes are displayed in detail, it would be annoying and is highly likely that a user would be inattentive and would overlook an unintended process, an error, or the like. Thus, methods and systems consistent with the invention give a notice to a user selectively.

A portable device consistent with the invention comprises a connecting interface, a judgment unit, and a user interface unit. The connecting interface connects the portable device with an IC module which executes a process relating to a service provided by a service terminal via contactless communication with the service terminal, the service terminal being located at a certain place. The judgment unit judges whether a change in a state data managed by the IC module related to the service satisfies a condition set as requiring an attraction of a user's attention, the change having been made by the process with a user's check eliminated. The user interface unit, responsive to a judgment that the condition is satisfied by the judgment unit, notifies a user of the change.

An IC module consistent with the invention for being used with a portable device comprises a processing unit, a memory, and a judgment unit. The processing unit executes a process relating to a service provided by a service terminal via contactless communication with the service terminal, the service terminal being located at a certain place. The memory is capable of storing a state data related to the service. The judgment unit judges whether a change in the state data stored in the memory satisfies a condition set as requiring an attraction of a user's attention, the change having been made by the process with a user's check eliminated. The judgment unit further instructs, responsive to a judgment that the condition is satisfied, a user interface unit of the portable device to notify a user of the change.

An IC card consistent with the invention for being attached to a portable device removably and re-attachably comprises a processing unit, a memory, and a judgment unit. The processing unit executes a process relating to a service provided by a service terminal via contactless communication with the service terminal, the service terminal being located at a certain place. The memory is capable of storing a state data related to the service. The judgment unit judges whether a change in the state data stored in the memory satisfies a condition set as requiring an attraction of a user's attention, the change having been made by the process with a user's check eliminated. The judgment unit further instructs, responsive to a judgment that the condition is satisfied, a user interface unit of the portable device to notify a user of the change.

A method consistent with the invention is for executing processes in a portable device mounted with an IC module. A process relating to a service provided by a service terminal via contactless communication between the IC module and the service terminal is executed, where the service terminal is located at a certain place. When a state data managed by the IC module related to the service is modified, it is judged whether a change in the state data satisfies a condition set as requiring an attraction of a user's attention, the change having been made by the process with a user's check eliminated. Responsive to a judgment that the condition is satisfied by the judgment unit, a user is notified of the change, through a user interface unit of the portable device.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

FIG. 3A shows a state of cooperative communication among an SE, a service terminal, and a portable device in the case of a process-A (a process without notice) in the first embodiment.

FIG. 3B shows a state of cooperative communication among an SE, a service terminal, and a portable device in the case of a process-B (a process with notice) in the first embodiment.

FIG. 4A shows a state of cooperative communication when a new application is added to an SE which uses a common process judgment section.

FIG. 4B shows a state of cooperative communication when a new application is added to an SE which uses a different process judgment section for each application.

FIG. 7A is an example of a table managing information of a threshold which is compared with the value balance.

FIG. 7B is another example of a table managing information of a threshold which is compared with the value balance.

FIG. 12A shows a state of cooperative communication among an SE, a service terminal, and a portable device in the case of a process-A (a process without notice) in the second embodiment.

FIG. 12B shows a state of cooperative communication among an SE, a service terminal, and a portable device in the case of a process-B (a process with notice) in the second embodiment.

DETAILED DESCRIPTION

Figure 1:
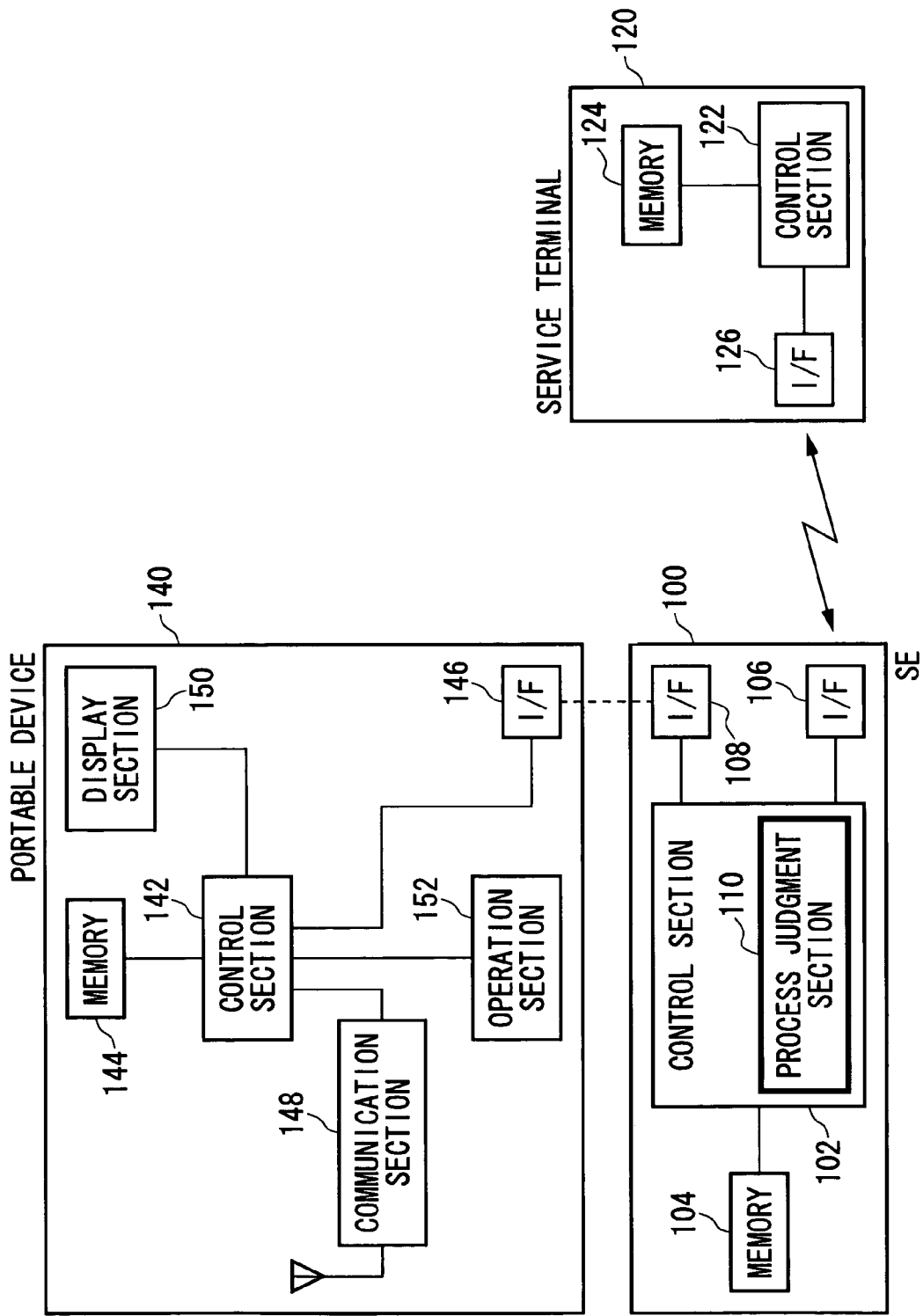
FIG. 1 is a configuration example of a secure element (SE), a service terminal, and a portable device related to a first embodiment.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

General Description

First, an outline of a case will be described where an IC module has a function to judge whether to notify a user regarding a process executed via contactless communication between itself and a service terminal. This case may be called the first embodiment.

An IC module related to the first embodiment mounted on and used with a portable device comprises: a unit to execute a process relating to a service provided by a service terminal via contactless communication with the service terminal, the service terminal being located at a certain place; a unit to hold state data relating to the service; and a unit to judge whether a change in the state data made by the process with a user's check eliminated satisfies a condition set as requiring an attraction of a user's attention, and to instruct a user interface function of the portable device to notify a user of the change in response to a judgment that the condition is satisfied.

Due to this configuration, when a user put an IC-module-mounted portable device over a service terminal as he/she passes a certain place to use a service, a process is executed via contactless communication between the service terminal and the IC module and the state data related to the service may be changed due to the process. This change is made without requiring a user, for example, to input a password or PIN (a secret number called 'Personal ID Number') before starting the process or to approve the change before finalizing the process. However, if the IC module judges that the change satisfies a condition set as requiring an attraction of a user's attention, a user will be notified by the use of the user interface function of the portable device. For example, user's attention will be attracted by lighting up a display, making a sound, or using a vibration function of the portable device.

The IC module related to the first embodiment may further comprise a unit to control so as to prevent an access to certain data of all data related to the process and an access to a program for executing the process from an unauthorized device for the service.

Due to this configuration, a device other than authorized devices for the service (e.g., service terminals which conduct the service) cannot access programs or highly confidential data in the IC module, and therefore a service requiring security such as e-commerce can be supported. It is possible to show a part of the data stored in the IC module (e.g., result of a process) on the display of an unauthorized portable device for the service, but in this case, only (less confidential) data permitted by an IC module's program is outputted to the portable device via a contact communication interface.

An IC card related to the first embodiment comprises the above-mentioned IC module related to the first embodiment and is attached to the portable device removably and re-attachably.

By connecting the IC card having such configuration to the portable device, a user of the portable device becomes able to use a service, and becomes able to receive notice selectively, via the user interface function of the portable device, regarding a change that requires attention among all the changes made by the process executed between the service terminal and the IC card.

The IC card related to the first embodiment may further comprise an interface that enables the contactless communication.

In this way, on one hand, the IC card can communicate with the service terminal via the contactless communication interface, and on the other hand, it can input and output data from/to the portable device via the contact communication interface.

The portable device related to the first embodiment comprises the above-mentioned IC module related to the first embodiment and the user interface function.

In this way, a user of a portable device incorporating an IC module or a portable device connected with an IC card type IC module can receive notice selectively via its user interface function regarding a change that requires attention among all the changes made by the process executed between the IC module mounted on the portable device and the service terminal.

The portable device related to the first embodiment may further comprise an interface that enables the contactless communication between the IC module and the service terminal.

Due to this configuration, even when the IC module only has a contact communication interface with the portable device as an interface to externals, the IC module can do contactless communication with the service terminal by using the contactless communication interface included in the portable device via the contact communication interface.

The above-mentioned IC module related to the first embodiment may further comprise a unit to memorize a plurality of application programs, wherein the process relating to the service is executed by one of the plurality of application programs, and judgment and instruction to notify a user regarding a change made to the state data by the process is executed by another program which is separate from the plurality of application programs and is made to be capable of detecting changes made by either process of the plurality of application programs.

In this way, the IC module can prevent inconsistency in that a user is notified of a change made by the process of one application program but is not notified of a change made by the process of another application program. Consistency of notice can thus be maintained. In addition, an investment in development can be cut down because there is no need to add new functions to judge a change and instruct to notify a user every time a new application program is developed.

An example of the state data in the above-mentioned IC module related to the first embodiment is data of a monetary value currently possessed by a user. Whether the condition set is satisfied or not may be judged depending on whether a process which decreases the monetary value has been executed or not.

In this way, in a service, such as a prepaid train ticket with a commuter pass, that allows a user to pass through a ticket gate by "touch and go," that is, without inputting a password, the user is not notified when the monetary value does not change (e.g., getting on and off within the section of the commuter pass, getting off within the section of minimum fare), and the user can be notified selectively when a process that consumes the monetary value has been executed (e.g., getting on and off out of the section of the commuter pass). Also, in a "bonus points service", for example, a user is not notified when the monetary value increases (complete the transaction accumulating bonus points), and the user can be notified selectively when a process that consumes the monetary value has been executed (complete the transaction using bonus points). In addition to this, whether to notify a user may be judged based on a degree of reduction in the monetary value (e.g., an amount reduced exceeds a threshold; a percentage of an amount reduced to the balance exceeds a threshold). User's attention can thus be attracted appropriately regarding a result of a process executed for a service.

In the example where the state data of the above-mentioned IC module related to the first embodiment is data of a monetary value currently possessed by a user, whether the condition set is satisfied or not may be judged depending on whether the monetary value has become a threshold or less as a result of the process.

In this way, for example, if a minimum fee required to use a service (e.g., a minimum price of a product in a vending machine, a minimum fare of transportation) is set as a threshold, by being notified when the balance becomes the threshold or less, a user can conduct in advance a charge process which increases the balance in the IC module before using the service the next time. Thus, it is possible to avoid a situation where a service terminal informs a user of insufficient funds and the "touch and go" flow of many other users is obstructed.

The above-mentioned threshold may be determined such that the IC module related to the first embodiment further comprises a unit to receive information about a fee for using the service via contactless communication with the service terminal, and that the threshold is determined based on the fee information received.

In this way, for example, in a case where a minimum fee required to use the service is updated, information about a new product price, a fare, or the like is sent to the IC module from the service terminal, and the threshold can be set based on the updated fee. Thus, the function to notify a user in advance regarding a likelihood of insufficient funds can be made to work efficiently.

In an example where the state data of the above-mentioned IC module related to the first embodiment is data of a monetary value currently possessed by a user and the certain place is a place passed by the user when he/she gets on or off a means of transportation (e.g., a train, an airplane, a toll road, etc.), an amount of money that will be required for using the means of transportation after the user passes the certain place may be predicted so as to set, based on the amount of money predicted, a threshold to judge whether or not the monetary value has been reduced to the level that requires an attraction of the user's attention.

In this way, when a user passes (at the time of getting on or off) a place where a service terminal of the means of transportation is located (e.g., ticket gate), it is possible to predict how much the monetary value in the IC module will be reduced when the user passes a place where another service terminal of the means of transportation is located (e.g., at the time of getting off at the destination or getting on at a place where he/she has got off immediately before). Thus, by dynamically setting a threshold based on the predicted result, the user can be notified precisely regarding a likelihood that the balance will be insufficient.

The above-mentioned amount of money required may be predicted based on at least one of the following: a type of the means of transportation; a place where a user got on the means of transportation; a place where a user got off the means of transportation; a day of the week that a user used the means of transportation; time that a user used the means of transportation; a monetary value that a user consumed when he/she used the means of transportation; and information of a commuter pass that a user has for the means of transportation.

In this way, for example, even in a case where the same IC module is used to get on and off a plurality of trains, an amount of money required can be predicted based on a minimum fare which differs depending on which train a user is going to use. Alternatively or additionally, a user's consumption pattern of a monetary value (e.g., when and which station does the user frequently use, an amount of money consumed at the time) may be memorized, and an amount of money required can be predicted with reference to this information. An amount of money required may also be predicted by comparing a user's consumption pattern with the present date and time, the location of the service terminal that the user passed immediately before, or the like.

The above-mentioned amount of money required may also be predicted as follows: The fee data of the transportation is acquired, and in a case where the certain place passed by the user is out of the section of the commuter pass that the user owns, the amount of money required is predicted based on the fee data by calculating a fee from the certain place passed by the user to a place within a section of the commuter pass.

In this way, for example, in a case where a user uses a train at a place out of the section of the commuter pass where he/she does not usually go to, and can not estimate how much money will be required, an amount of money required to go to the section within the commuter pass will be predicted and whether the balance in the IC module is sufficient or not will be notified to a user. For this purpose, the fee data which is stored in the IC module or collected by the portable device from the outside sources may be acquired.

The above-mentioned amount of money required may also be predicted as follows: The fee data of the transportation and place data indicating where the user is going after passing the certain place are acquired, and then the amount of money required is predicted by calculating, based on the fee data of the transportation from the certain place, a fee to a place where the user is expected to get off the means of the transportation as indicated by the place data.

In this way, for example, by predicting a place where a user is expected to get off from information of an e-ticket (including date, time, and place of an event) stored in the IC module or information of a user's schedule (including date, time, and place in a schedule) held by the portable device, an amount of money required to get there is predicted and whether the balance in the IC module is sufficient or not will be notified to the user. The place where the user is expected to get off may also be predicted by comparing information of the ticket and the schedule with the present date and time, a location of the service terminal that the user passed immediately before, or the like.

Another example of the state data in the above-mentioned IC module related to the first embodiment is data of a place to go after a user passes the certain place. Whether the condition set is satisfied or not may be judged depending on whether or not the place to go is newly determined or changed as a result of the process.

In this way, for example, in a case of a concert ticket or a plane ticket, where a confirmed seat (a place to go) at the concert venue or on the plane is written into the IC module by the service terminal located there as the user passes an entrance of the concert venue or a check-in counter of the airlines, the user is not notified if the confirmed seat is the same as seat information temporarily held in the IC module or the portable device at the time of purchase, but the user can be notified if the seat information was not given at the time of purchase or if the confirmed seat is different from the temporary seat. Also, in another example where a user passes a gate of a building and the service terminal located there writes into the IC module a place of a meeting in the building that the user is to attend, the user can be notified selectively as well.

Still another example of the state data in the above-mentioned IC module related to the first embodiment is data of a schedule after a user passes the certain place. Whether the condition set is satisfied or not may be judged depending on whether or not a time in the schedule is newly determined or changed as a result of the process.

In this way, for example, in a case where a user passes an entrance of a company to go to his/her office and the service terminal located there writes into the IC module a time of a schedule confirmed on that day, the user is not notified if there is no change in the time of the schedule previously held in the IC module or the portable device, but the user can be notified if the time has been changed or newly determined.

Still another example of the state data in the above-mentioned IC module related to the first embodiment is data of an event planned to occur after the user passes the certain place. Whether the condition set is satisfied or not may be judged depending on whether or not details of the event is newly determined or changed as a result of the process.

In this way, for example, in a case where a user passes an entrance of an event venue and the service terminal located there writes into the IC module confirmed contents of the event (e.g., a program, a title, performers, panelists), the user is not notified if there is no change in the contents of the event previously held in the IC module or the portable device, but the user can be notified if the contents have been changed or newly determined.

A service processing method related to the first embodiment is executed in the IC module mounted on and used with the portable device. The method comprises: executing a process relating to a service provided by a service terminal located at a certain place, via contactless communication with the service terminal; modifying the state data related to the service held by the IC module as a result of the process; judging whether or not a change in the state data made with a user's check eliminated satisfies a condition set as requiring an attraction of a user's attention; and instructing, in response to a judgment that the condition is satisfied, a user interface function of the portable device to notify a user.

All of the above-mentioned matters regarding the IC module related to the first embodiment are applicable to the service processing method related to the first embodiment. The first embodiment can also be practiced by providing a program which is stored in a memory of the IC module mounted on and used with a portable device so as to execute a service process, and by providing a storage medium which memorizes such a program.

Next, an outline of a case will be described where a portable device has a function to judge whether to notify a user regarding a process executed via contactless communication between the IC module and the service terminal. This case may be called the second embodiment.

A portable device related to the second embodiment comprises: a connecting interface unit to connects with an IC module that executes a process relating to a service provided by a service terminal via contactless communication with the service terminal, the service terminal being located at a certain place; a judgment unit to judge whether a change, made in state data related to the service which is managed by the IC module and made by the process with a user's check eliminated, satisfies a condition set as requiring an attraction of a user's attention; and a user interface unit to notify a user in response to a judgment that the condition is satisfied.

Due to this configuration, when a user put an IC-module-mounted portable device over a service terminal as he/she passes a certain place to use a service, a process is executed via contactless communication between the service terminal and the IC module and the state data related to the service may be changed due to the process. This change is made without requiring a user, for example, to input a password or PIN (a secret number called 'Personal ID Number') before starting the process or to approve the change before finalizing the process. However, if the portable device judges that the change satisfies a condition set as requiring an attraction of a user's attention, a user will be notified by the use of the user interface function of the portable device. For example, user's attention will be attracted by lighting up a display, making a sound, or using a vibration function of the portable device.

The IC module connected to the connecting interface unit in the portable device related to the second embodiment may be configured such that it controls so as to prevent an access to certain data of all data related to the process in the IC module and an access to a program in the IC module for executing the process from an unauthorized device for the service.

Due to this configuration, a device other than authorized devices for the service (e.g., service terminals which conduct the service) cannot access programs or highly confidential data in the IC module, and therefore a service requiring security such as e-commerce can be supported. Of all the information sent from the IC module to the judgment unit of the portable device (e.g., result or details of a process), only (less confidential) data permitted by an IC module's program is received by the portable device via a connecting interface unit.

The connecting interface unit in the portable device related to the second embodiment may attach an IC card mounted with the IC module removably and re-attachably.

In this way, a user of the portable device can replace an IC card depending on a service he/she wants to use, and whichever IC card he/she uses, he/she can receive notice selectively, via the user interface function of the portable device, regarding a change that requires attention among all the changes made by the process executed between the service terminal and the IC card.

The above-mentioned IC card may comprise a contactless communication interface that enables the contactless communication.

In this way, on one hand, the IC card can communicate with the service terminal via the contactless communication interface, and on the other hand, it can send certain information to the portable device via the connecting interface unit.

The portable device related to the second embodiment may further comprise a contactless communication interface unit that enables the contactless communication between the IC module and the service terminal.

Due to this configuration, even when the IC module only has a connecting interface unit with the portable device as an interface to externals, the IC module can do contactless communication with the service terminal by using the contactless communication interface unit included in the portable device via the connecting interface.

In the portable device related to the second embodiment, information received via the connecting interface unit includes information that can identify an application program which executed in the IC module a process relating to the service, and the judgment unit may judge using the condition corresponding to the application program that made the change.

In this way, the portable device side can identify which application program executed a process that made a change to be judged. So, when an IC card is replaced and a different application is executed, or when one of a plurality of application programs existing in the IC card is executed, the portable device can use a criterion of judgment suitable for the executed application program, that is, the used service.

In the portable device related to the second embodiment, information received via the connecting interface unit includes information with which details of the change made in the state data in the IC module can be detected, and the judgment unit may judge whether the details of the change satisfies the condition or not.

In this way, since the IC module side sends the information with which the details of the change can be detected, the portable device side can judge whether to give a notice to attract a user's attention. Examples of the information with which the details of the change can be detected are a set or a difference of the state data before and after the process, a type of the process (e.g., subtraction, addition, overwriting of character strings), or the like. In a case where the portable device side holds received information, only the state data after the process may be sent from the IC module side since the state data before the process is already held.

An example of the state data in the above-mentioned portable device related to the second embodiment is data of a monetary value currently possessed by a user. As in the first embodiment, whether the condition set is satisfied or not may be judged depending on whether a process which decreases the monetary value has been executed or not.

In the example where the state data of the above-mentioned portable device related to the second embodiment is data of a monetary value currently possessed by a user, as in the first embodiment, whether the condition set is satisfied or not may be judged depending on whether the monetary value has become a threshold or less as a result of the process.

The above-mentioned threshold may be determined such that the portable device related to the second embodiment further comprises a unit to receive information about a fee for using the service via a wireless network, and that the threshold is determined based on the fee information received. In this way, for example, in a case where a minimum fee required to use the service is updated, information about a new product price, a fare, or the like can be obtained via the wireless network, and the threshold can be set based on the updated fee. Thus, the function to notify a user in advance regarding a likelihood of insufficient funds can be made to work efficiently.

In an example where the state data of the above-mentioned portable device related to the second embodiment is data of a monetary value currently possessed by a user and the certain place is a place passed by the user when he/she gets on or off a means of transportation, as in the first embodiment, an amount of money that will be required for using the means of transportation after the user passes the certain place may be predicted so as to set, based on the amount of money predicted, a threshold to judge whether or not the monetary value has been reduced to the level that requires an attraction of the user's attention.

The above-mentioned amount of money required may be predicted based on at least one of the following: a type of the means of transportation; a monetary value that a user consumed when he/she used the means of transportation; a day of the week that the consumption occurred; and time when the consumption occurred. In this way, for example, an amount of money required can be predicted based on a minimum fare which differs depending on which application program for which railroad a user executed. Alternatively or additionally, a user's consumption pattern of a monetary value (e.g., when and how much money the user consumed) may be memorized, and an amount of money required can be predicted with reference to this information. An amount of money required may also be predicted by comparing a user's consumption pattern with the present date and time.

The above-mentioned amount of money required may also be predicted as follows: The fee data of the transportation is acquired, and in a case where the certain place passed by the user is out of the section of the user's commuter pass, the amount of money required is predicted based on the fee data by calculating a fee from the certain place passed by the user to a place within a section of the commuter pass. In this way, for example, in a case where a user uses a train at a place out of the section of the commuter pass where he/she does not usually go to, and can not estimate how much money will be required, an amount of money required to go to the section within the commuter pass will be predicted and whether the balance in the IC module is sufficient or not will be notified to a user. For this purpose, the fee data can be acquired, for example, via the wireless network. Incidentally, there is a possibility that information to specify a station where a user got on or off or information to specify a section of the user's commuter pass is not outputted to the outside of the IC module on the ground that they are highly confidential. In this case, they are obtained separately, for example, by the portable device making a user input information of the section of the commuter pass, or by the use of place information of the portable device which can be obtained by the GPS or the like.

The above-mentioned amount of money required may also be predicted as follows: The fee data of the transportation and place data indicating where the user is going after passing the certain place are acquired, and then the amount of money required is predicted by calculating, based on the fee data of the transportation from the certain place, a fee to a place where the user is expected to get off the means of the transportation as indicated by the place data. In this way, for example, by predicting a place where a user is expected to get off, from information of a user's schedule (including date, time, and place in a schedule) held by the portable device, an amount of money required to get there is predicted and whether the balance in the IC module is sufficient or not will be notified to the user. The place where the user is expected to get off may also be predicted by comparing information of the schedule with the present date and time. The place where the user got on may also be identified based on the information of the schedule, the place information of the portable device, or the like.

Another example of the state data in the above-mentioned portable device related to the second embodiment is data of a place to go after a user passes the certain place. As in the first embodiment, whether the condition set is satisfied or not may be judged depending on whether or not the place to go is newly determined or changed as a result of the process.

Still another example of the state data in the above-mentioned portable device related to the second embodiment is data of a schedule after a user passes the certain place. As in the first embodiment, whether the condition set is satisfied or not may be judged depending on whether or not a time in the schedule is newly determined or changed as a result of the process.

Still another example of the state data in the above-mentioned portable device related to the second embodiment is data of an event planned to occur after the user passes the certain place. As in the first embodiment, whether the condition set is satisfied or not may be judged depending on whether or not details of the event is newly determined or changed as a result of the process.

A service processing method related to the second embodiment comprises: executing a process relating to a service provided by a service terminal located at a certain place, via contactless communication between the IC module mounted on the portable device and the service terminal; modifying the state data related to the service managed by the IC module as a result of the process; judging whether or not a change in the state data made with a user's check eliminated satisfies a condition set as requiring an attraction of a user's attention; and notifying, in response to a judgment that the condition is satisfied, a user via a user interface function of the portable device.

All of the above-mentioned matters regarding the portable device related to the second embodiment are applicable to the service processing method related to the second embodiment. The second embodiment can also be practiced by providing a program which is stored in a memory of the portable device so as to execute a service process, and by providing a storage medium which memorizes such a program. When the portable device has at least one of a schedule management function, a memo pad function, an e-mail function, an Internet access function, and a portable device locating function, judgment in the portable device or the service processing method related to the second embodiment may also be made by referring to the information obtained from them.

In any one of the above-mentioned embodiments, when a portable device mounted with a contactless type IC module is set as password-free to make use of the "touch and go" advantage of the contactless type, and a process requiring an attraction of a user's attention is executed via communication between a service terminal and the IC module, the user can be clearly notified of this execution via a user interface function of the portable device. Accordingly, a user can easily check whether an unintended process or an error has occurred or not, which is useful, for example, for electronic settlement, management of entry into a place or a room, fare adjustment of a means of transportation, or the like.

Judgment In IC Module

The first embodiment will be described below in detail with reference to drawings.

In this embodiment, an IC module is tamper resistant, which is required for an IC card function, and can maintain confidentiality of a program or important data contained in the IC module. Therefore, the IC module of this embodiment is called a secure element (SE).

FIG. 1 is a configuration example of a secure element (SE) 100, a service terminal 120, and a portable device 140 related to the embodiment. The SE 100 may be mounted on an IC card which is attached to the portable device 140 removably and re-attachably or may be incorporated in the portable device. In the former, the SE 100 composes the IC card, while in the latter the SE 100 and the portable device 140 as a whole is called the portable device.

The SE 100 comprises a control section 102 that controls operation of an application program in the SE and controls SE's communication with other devices, and a memory 104 that stores an application program for receiving a service, data related to a service, or the like. The control section 102 shows a functional block and is actually realized by CPU, EEPROM, or the like. The SE 100 also has an interface (contactless I/F) 106 for contactless communication with the service terminal 120 and an interface (contact I/F) 108 for connecting with the portable device 140. A process judgment section 110 has, as described later, a function to monitor and judge a process executed by an application program in the SE and to notify the portable device 140 via the contact I/F 108.

The service terminal 120 is set at a certain place like vending machines, check-out counters, ticket gates at stations, check-in counters at airports, entrances and exits of concert venues, gates of offices and factories, or the like. It comprises a control section 122 that controls operation of an application program in the service terminal and controls service terminal's communication with other devices, and a memory 124 that stores an application program for providing a service, related data, or the like. The service terminal 120 also has an interface 126 that can do contactless communication with the SE 100, so when a user passes a certain place, he/she can receive a certain service by bringing the carrying SE 100 near to the service terminal 120.

The portable device 140 comprises a control section 142 that controls operation of the portable device and its communication with other devices, a memory 144 that stores application programs to make the portable device execute various operations, related data, or the like, a communication section 148 that communicates with a cell telephone network, and a contact I/F 146 that can connect with the contact I/F 108 of the SE 100. The portable device 140 also comprises an operation section 152 that accepts operations by the user via a keypad, button, microphone, or the like, and a display section 150 that outputs to the user by a display, LED indicating an incoming call, other exclusive indicator light, or the like of the portable device. The output from the display section 150 is not limited to an output appealing to user's sense of sight. It may be an output appealing to the sense of hearing (a speaker or a headphone jack) or to the sense of touch (a vibration function).

Figure 2:
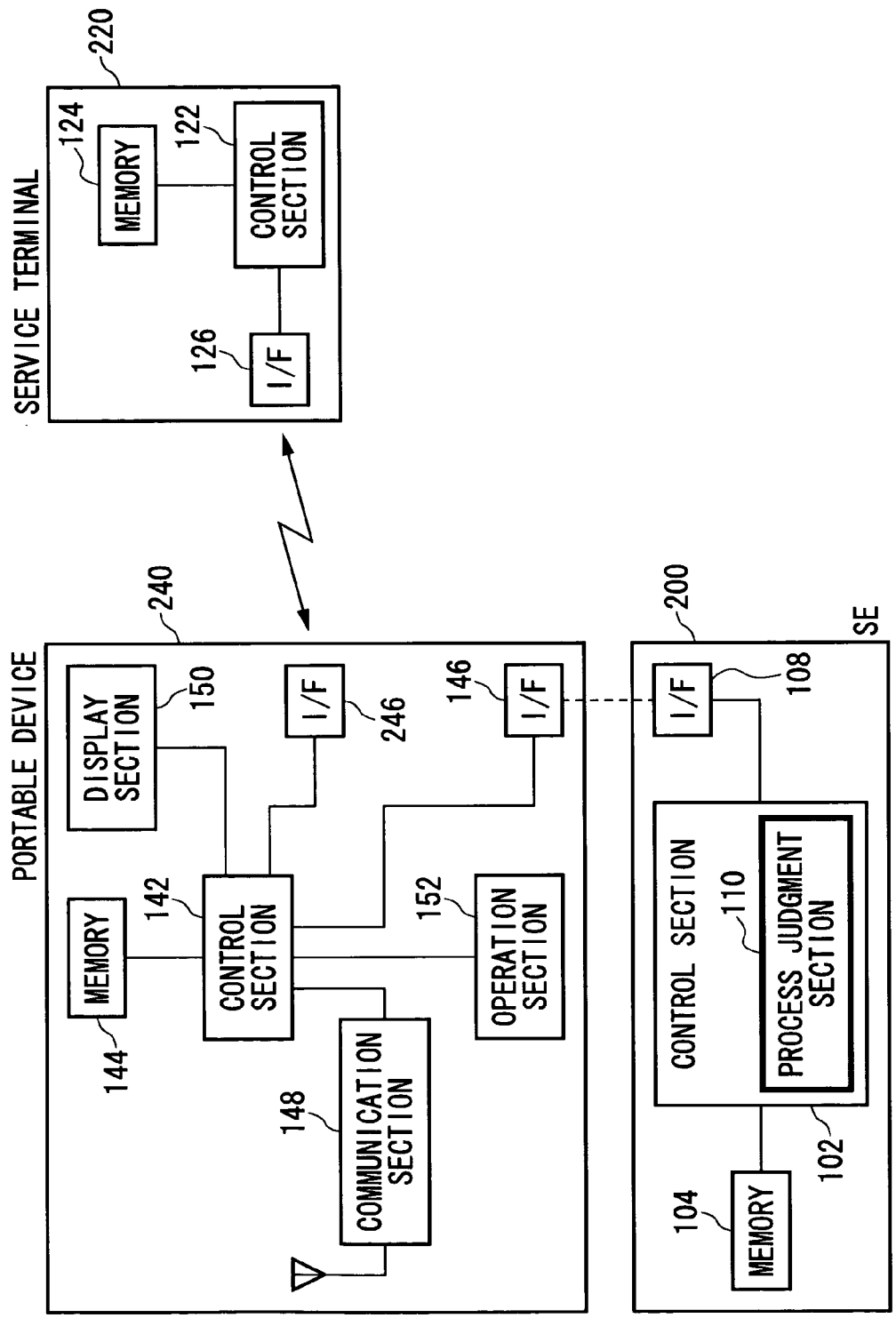
FIG. 2 is another configuration example of an SE, a service terminal, and a portable device related to the first embodiment.

FIG. 2 shows another configuration example of the embodiment. A secure element (SE) 200 is the same as the SE 100 of FIG. 1 except for not having the contactless I/F 106. A portable device 240 is the same as the portable device 140 of FIG. 1 except for being added with a contactless I/F 246. A service terminal 220 is the same as the service terminal 120 of FIG. 1 except that the contactless I/F 126 dose contactless communication with the contactless I/F 246 of the portable device 240. The SE 200 does contactless communication with the service terminal 220 by using the contactless I/F 246 of the portable device 240 via the contact I/F 108 and 146. Incidentally, the SE 200 may be mounted on an IC card which is attached to the portable device 240 removably and re-attachably or may be incorporated in the portable device. In the former, the SE 200 composes the IC card, while in the latter the SE 200 and the portable device 240 as a whole is called the portable device.

FIG. 3A and FIG. 3B shows how an appropriate notice is given to a user regarding each process of a service executed by "touch and go" via the above-mentioned cooperative communication among three parties of the SE, the service terminal, and the portable device. Here, the embodiment will be described taking as an example a service where a process was executed in a password-less manner even in a case of consuming a value (monetary value) and so the value may have decreased without a user knowing it.

The SE of the example clearly notifies a user about consumption of the value when a process is executed via contactless communication with the service terminal. For this purpose, the process judgment section 110 monitors and judges processes in the SE, and when a process consuming (subtracting) a value is executed, an instruction to notify is given to the portable device after the contactless communication process finishes and a user's attention is attracted by, for example, lighting up an LED of the display section 150. When a process of deletion or cancellation, which corresponds to a subtraction, is executed, an instruction to notify (e.g., command to light up the LED) is given to the portable device. In this way, even for just one service, a notice is given depending on which process has been executed in the SE.

In an example of a service at ticket gates of railroads, the SE has a ticket gate application (an application program) in which commuter pass data and e-money are stored under secure protection. There are two cases for the ticket gate application: one is when only the commuter pass data is used; and the other is when fare adjustment by e-money occurs at a place out of the section of the commuter pass. When a user gets on or off within the section of the commuter pass, an LED of the portable device remains unlit. On the other hand, when a fare is adjusted by e-money at a ticket gate machine at a time of entering or exiting the ticket gate located out of the section of the commuter pass, a user is notified with a clear indication such as the LED of the portable device lighting up in red.

In an example of a service using a bonus point card, the SE has a bonus point application (an application program) in which data of current bonus points are stored under secure protection. There are two cases for the bonus point application: one is when transactions are completed by accumulating points; and the other is purchasing at a discount using the points. When a user accumulated points, an LED of the portable device remains unlit, but when the transaction was completed using the points, a user is notified with a clear indication such as the LED lighting up in blue.

FIG. 3A shows a case where a process-A in which a value is not consumed, such as the process at a ticket gate using a commuter pass or the process accumulating points, is executed via contactless communication between an application 112 (the ticket gate application or the bonus point application) of the SE and an application 128 of the service terminal. This contactless communication is done via the contactless I/F 106 and 126. The control section 102 controls execution of the application 112 in the SE and communication via the contactless I/F 106, and the control section 122 controls execution of the application 128 in the service terminal and communication via the contactless I/F 126.

The process judgment section 110 composing a part of the control section 102 of the SE can monitor a process executed by the application 112 whose operation is controlled by the control section 102, and can judge whether to notify a user. The process judgment section 110 monitors a value which will be securely written into as a result of a process. It may judge whether a process that consumes a value has been executed or not by comparing with a value before the process, or by monitoring a type of a library used for the process by the application 112.

In FIG. 3A, an instruction to the display section 150 of the portable device is not given because the value is not consumed as a result of the process-A. However, depending on an application 154 implemented in the portable device, a notice of the result of the process may be required even if the value is not consumed. In such a case, not the process judgment section 110 but the application 112 of the SE may notify the result of the process-A to the application 154, via the contact I/F 108 and 146, so that the current value, a message saying "the ticket gate process within the section of the commuter pass has been executed," or other information is indicated on a display or the like which is different from the LED or the like used by the process judgment section 110 to attract a user's attention. The display section 150 used by the judgment section 110 to attract a user's attention can be used as the display or the like used to indicate a result of a process by the application 154 of the portable device, but in this case, an indication to attract a user's attention may be more eye-catching than an indication of a result of a process, for example, by flashing the whole display or the like.

FIG. 3B shows a case where a process-B in which a value is consumed, such as the fare adjustment by e-money for a route to/from a place out of the section of the commuter pass or the process using points, is executed via contactless communication between the application 112 (the ticket gate application or the bonus point application) of the SE and an application 128 of the service terminal. The process judgment section 110 of the SE detects, by monitoring a change in the value or a type of the process executed by the application 112, that the process consuming the value has been executed, and sends an instruction to the display section 150 (e.g., LED) of the portable device via the contact I/F 108 and 146 to attract a user's attention. In addition to this, the application 112 of the SE may notify the result of the process-B to the application 154 of the portable device so that the current value, a message saying that "340 yen has been deducted due to the fare adjustment for the route to/from the place out of the section of the commuter pass," or other information is indicated on a display or the like of the portable device.

FIG. 4A and FIG. 4B shows variations of implementation of a process judgment section. A case was described in FIG. 3A and FIG. 3B where the process judgment section 110 is implemented in the control section 102 as shown in FIG. 4A. In another case where a process judgment section 116 is implemented in the application 112 of the SE as shown in FIG. 4B, cooperative communication among three parties of the SE, the service terminal, and the portable device can be realized similarly.

In FIG. 4A, the process judgment section 110 exists in isolation from other individual applications of the SE and is implemented so as to monitor all these applications in common. It is thus easy to add a new application 114 that provides a different service while maintaining consistency of notice that attracts a user's attention. To be concrete, when a process-C is executed via contactless communication between the new application 114 and an application 130 of the service terminal, and when the process consumes a value, the process judgment section 110 detects the value consumption, as in the case where it detected the value consumption when the process-B of the application 112 was executed, and notifies the display section 150 of the portable device.

In this way, a user's attention will be attracted consistently for a process that consumes a value using one application 112 and also for a process that consumes a value using another application 114, so the user will not get confused. And, if the new application 114 handles the same value handled by the already implemented application 112 (e.g., the application 112 is a ticket gate application and the new application is a train ticket purchase application for the same railroad), the process judgment section 110 can monitor and judge, as the way it is, the new application 114. Even if the new application 114 handles a different value from the one handled by the application 112 (e.g., the application 112 is a ticket gate application and the new application is a bonus point application irrelevant to the railroad), provided that these applications execute processes using a common library provided by the control section 102 and that the process judgment section 110 is to detect a type of a library used by each application, the process judgment section 110 can monitor and judge, as the way it is, the new application 114. In a case where the process judgment section 110 is to detect a change in a value, if the process judgment section 110 is instructed, when the new application 114 is added, of a new reading method for a value handled by the new application 114 so that it can read out values corresponding to each application, it will be able to monitor and judge both the application 112 and the new application 114.

Meanwhile, in FIG. 4B, the process judgment sections 116 and 118 are implemented in the applications 112 and 114 respectively. In a case where the process judgment section 116 detects that a value was consumed when the process-B of the application 112 was executed and notifies the display section 150 of the portable device, the process judgment section 118 with the following function will be implemented in the new application 114 in order to maintain consistency of notice for a user. That is, when a process-C is executed via contactless communication between the new application 114 and the application 130 of the service terminal, and when the process consumes a value, the process judgment section 118 notifies the display section 150 of the portable device as the process judgment section 116 does. In the manner of FIG. 4B, there is a possibility that a user will get confused because notice is given or not given depending on applications, since a notice will not be given even if a value consuming process is executed when a new application without a function of a process judgment section is added. To prevent this situation, in the manner of FIG. 4B, the function of the process judgment section is to be implemented for each application. And this redundancy in development may be a disadvantage. However, there may be cases other than the example of simply judging whether a value has been consumed or not, such as a case where each application is specialized and uses different judgment method (the details will be described later). In such cases, it may be more preferable to implement a process judgment section in each application than to have one for common use.

Figure 5:
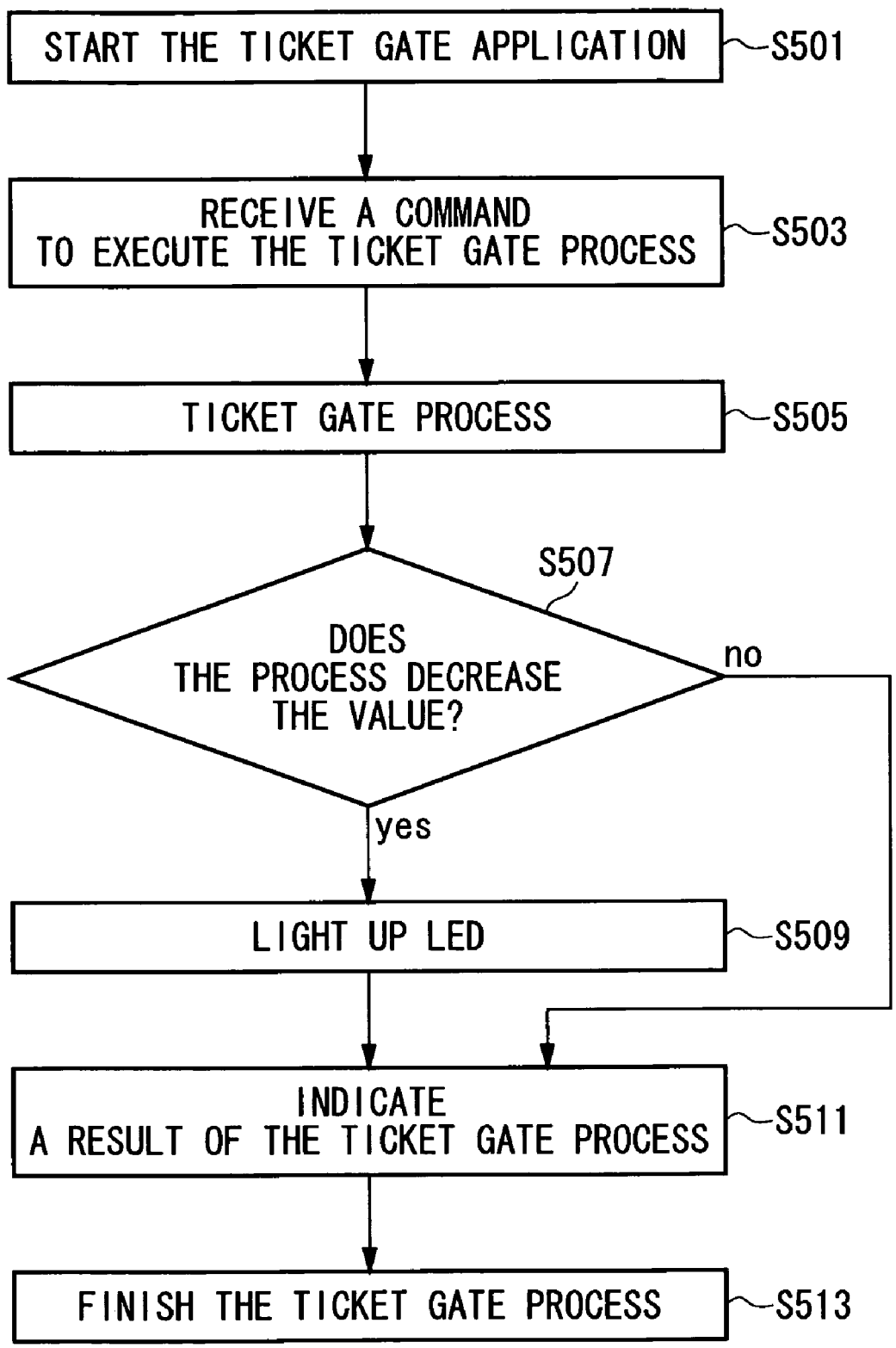
FIG. 5 is an example of operation of an SE's control section when a user is notified according to value consumption.

FIG. 5 illustrates an operation of the control section 102 comprising the above-mentioned process judgment section 110, taking a ticket gate application as an example. First, when a user puts the portable device mounted with the SE over the service terminal located at a gate of a certain railroad, the control section 102 of the SE receives from the service terminal a command to start a ticket gate application (e.g., application 112) that corresponds to the service, and starts the ticket gate application. (S501) Then, a command to execute a ticket gate process is received via contactless communication with the service terminal. (S503) According to the command, the ticket gate process (e.g., data of the boarding station and commuter pass is sent to the service terminal; in response, an amount of the adjusted fare is sent back from the service terminal; and this amount is deducted from a value in the SE for the railroad use) is executed. (S505) The above-mentioned command to execute the ticket gate process is received and executed by the application 112 under control of the control section 102, and the process judgment section 110 judges whether or not the value in the SE has been reduced due to the execution. (S507) When it judges that the result was a subtraction, the LED or the like of the portable device is made to light up to attract a user's attention (S509), and when it judges that the result was not a subtraction, the ticket gate process finishes without further action. (S513) In either judgment, the result of the ticket gate process may optionally be indicated on the display or the like of the portable device before the ticket gate process finishes. (S511)

Shown in FIG. 5 was an example of sending a notice to attract a user's attention whenever a process that consumes a value is executed. But, if the number of the notice is considered too many and annoying, the notice can be sent only when it is considered to be really needed. The cases where the notice is considered to be really needed differ depending on a nature of the application or the like, and it will be set by a service provider or the like, or by a user himself/herself. Various setting examples will be described below.

First, in cases where a value is consumed, one possible judgment method is such that the display section of the portable device is lit when an amount of the value subtracted is large (e.g., more than 500 yen), but that the display section remains unlit when the amount subtracted is small (e.g., 500 yen or less). And in cases where a value is consumed, another possible judgment method is such that the display section of the portable device is lit when a percentage of an amount subtracted to a total amount of the value is large (e.g., when the balance is 5000 yen and the amount subtracted is 501 yen or more, which is more than 10 percent), but the display section remains unlit when the percentage of the amount subtracted is small (e.g., 10 percent or less). An amount or a percentage subtracted, which is to be a threshold, in these methods may be common to a plurality of applications or may be different for each application.

Figure 6:
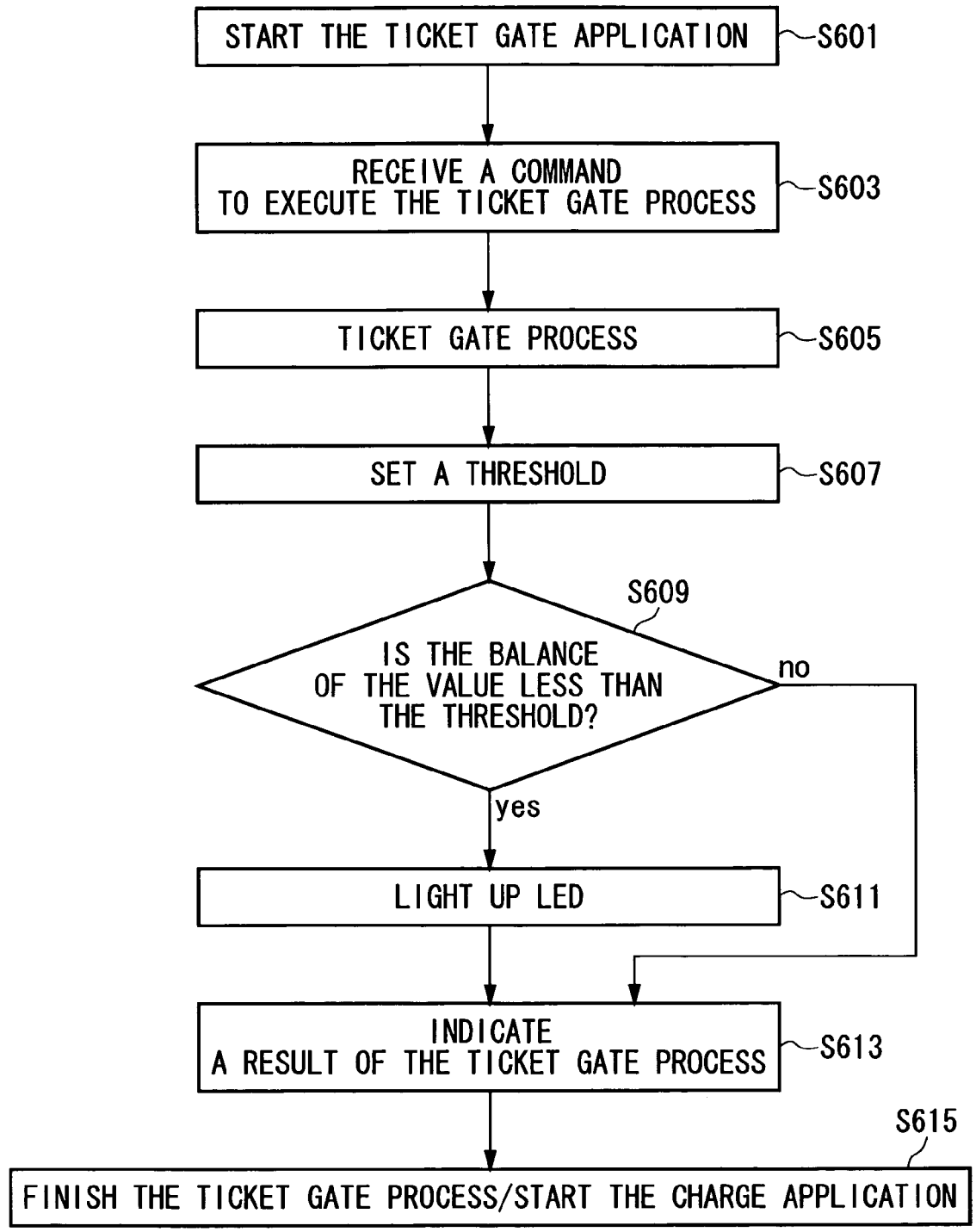
FIG. 6 is an example of operation of an SE's control section when a user is notified according to the value balance.

Still another judgment method is such that the display section of the portable device is lit when a process reduces the balance of the value to a threshold or less, but the display section remains unlit otherwise. FIG. 6 illustrates, taking a ticket gate application as an example, an operation of the control section 102 comprising the process judgment section 110 that uses this judgment method. Threshold values to be a standard of judgment are held, for example, by the process judgment section 110 as shown in FIG. 7A. These values may be set by a user for every service or for every process, or may be set by a service provider or the like in advance. Incidentally, a threshold management table shown in FIG. 7A may be held as data having a TLV structure.

When a user puts the portable device mounted with the SE over a service terminal located at a gate of a certain railroad, the control section 102 of the SE receives from the service terminal a command to start a ticket gate application (e.g., application 112) for railroad A that corresponds to the service, and starts the ticket gate application. (S601) Then, it receives a command to execute a ticket gate process via contactless communication with the service terminal. (S603) According to the command, it executes the ticket gate process (e.g., data of the boarding station and commuter pass is sent to the service terminal; in response, an amount of the adjusted fare will be sent back from the service terminal; and this amount will be deducted from a value in the SE for the railroad use). (S605)

Here, the process judgment section 110 knows that the currently operating application is the ticket gate application for the railroad A, and gets to know, by receiving the above-mentioned command to execute the ticket gate process, that the current process is for exiting the ticket gate. Based on this information and by referring to the threshold management table of FIG. 7A, 150 yen is derived as a threshold. (S607) Meanwhile, for example, if the currently operating application is a ticket gate application for a railroad B, and if the above-mentioned command to execute the ticket gate process is. a command to subtract the minimum fare from the value in the SE, which means the current process is for entering the ticket gate, 120 yen is derived as a threshold based on this information and by referring to the threshold management table of FIG. 7A. These thresholds are set to allow a user to know in advance, for example, of the following situation: if a user will not have done a charge process that increases an amount of e-money in the SE to increase the value, the user will not be able to use a similar service terminal the next time due to the insufficient balance. In this example, a threshold at the time of exiting a ticket gate (the time of getting off) may be set based on a minimum fare which will be required to enter (get on a train of) the same railroad the next time, and a threshold at the time of entering a ticket gate (the time of getting on) may be set based on an amount predicted suitably as an additional fare which will be required to get off the train.

The above-mentioned ticket gate process is executed by the application 112 under control of the control section 102, and the process judgment section 110 judges whether or not the balance of a value in the SE has become less than the threshold which is set as above. (S609) When it judges that the balance has become less than the threshold, the LED or the like of the portable device is made to light up to attract a user's attention (S611), and when it judges that the value has not become less, the ticket gate process finishes without further action. (S615) In either judgment, the result of the ticket gate process may optionally be indicated on the display of the portable device or the like before the ticket gate process finishes. (S613)

Moreover, when the balance is judged to have become less than the threshold, in addition to attracting a user's attention as mentioned above, an on-line charge application may be started automatically at the time that the ticket gate process finishes (S615), allowing a user to do an appropriate charge process promptly. The charge process can be executed via contactless communication between a service terminal that does a charge and the SE. It can also be executed by communication between the SE and a remote terminal such as a bank service terminal or a server terminal of a ticket gate system via the communication section 148 of the portable device. The latter is called an on-line charge process.

There is a possibility that the thresholds shown in FIG. 7A needs to be changed due to a revision of the train fare. However, they may be changed dynamically by transmission of data of the revised minimum fare or the like to a first SE that does contactless communication with the service terminal for that railroad after the revision of the fare via contactless I/F 126 and 106.

A threshold as a standard of judgment can also be calculated dynamically such that it would be a customized figure for each user. (S607) FIG. 7B shows an example of the calculated data or the data used as a basis of calculation in this case. In FIG. 7B, data of an average consumption value and data of frequently boarding/deboarding sections are made and held by the process judgment section 110, and data of a commuter pass is held securely in the memory 104 of the SE by the ticket gate application and is referred to by the process judgment section 110.

One example is where a trend of user's value consumption is held as a management table and a threshold is updated dynamically. For example, as shown in FIG. 7B as the average consumption value, an average of the consumed value is held for every day of the week and for every time frame. This data can be derived, for example, by memorizing in the SE information of date and time and information of an amount of the consumed value which are obtained at a service terminal every time a ticket gate exit process is executed at the service terminal on a user's getting off a train, and by calculating an average of the memorized consumed values for every day of the week and for every time frame in the past few weeks or few months. Incidentally, the value consumed at the time of the ticket gate exit process is an amount of additional fare. The sum of this additional fare and the minimum fare deducted at the time of the entry process, that is, a fare of a section from boarding to deboarding, may be memorized instead. Then the process judgment section 110 that operates according to FIG. 6 can read out the average of the consumed value of corresponding day of the week and time frame based on the date and time at which the ticket gate application is started, and can set a threshold to be a standard of judgment based on the figures read. A threshold may also be set such that when the current process is a ticket gate exit process, it is set based on the minimum fare of the same railroad by referring to FIG. 7A, and when the current process is a ticket gate entry process, it is set based on the additional fare which will most likely be needed at the time of deboarding by referring to FIG. 7B.

As shown in FIG. 7B as the frequently boarding/deboarding sections, some of high-ranking data regarding sets of boarding and deboarding stations which were used for a plurality of times and the amount of money to be required may be held. This data can be derived, for example, by memorizing in the SE information of boarding and deboarding stations which are obtained at a service terminal every time a ticket gate exit process is executed at a service terminal on a user's getting off a train, and by counting how many times the same set of boarding and deboarding stations has been memorized in the past few weeks or few months. Incidentally, as an amount of the fare required for a set of boarding and deboarding stations, an amount of a value consumed at the time of the ticket gate exit process (additional fare) for the corresponding boarding and deboarding may be memorized; or the sum of this additional fare and the minimum fare to be deducted at the time of the entry process, that is, a fare of a section from boarding to deboarding may be memorized; or a fare database which is described later may be consulted for the fare of the corresponding section from boarding to deboarding. Then, the process judgment section 110 that operates according to FIG. 6 can search frequently boarding/deboarding sections of FIG. 7B using, as a key for the search, information of the boarding station obtained from the service terminal when the executed ticket gate process is an entry process; and can set a threshold to be a standard of judgment based on the amount of the fare required for the most frequently boarding/deboarding section among those that match the key.

Another example is that a threshold is dynamically updated in conjunction with other registered data in the SE (or in the portable device or on-line). For example, a conjunction with a fare database stored in the memory 104 of the SE (or in a remote database server that can be accessed via the memory 144 or the communication section 148 of the portable device) is possible. To be specific, when a user boarded/deboarded at a place out of the section of the commuter pass, an amount of fare from the boarding/ deboarding station to the section of the commuter pass can be calculated by referring to the fare database, based on the section of the commuter pass shown in the commuter pass information in FIG. 7B and on information of the station where the service terminal that the SE was put over is located. A threshold is then set according to this amount, so that the user can get to know at a glance whether or not the balance of the value is sufficient to return to the section of the commuter pass when he/she uses a station out of the section of the commuter pass.

In a case where a ticket application or a schedule management application, which is described later, coexists in the SE, a conjunction with information of date, time, and place indicated by the ticket or the schedule is also possible. Incidentally, since the schedule management application is beyond the confines of the e-commerce, it may exist as an application 154 of the portable device and not of the SE. And information of the ticket and schedule may be stored in the memory 144 of the portable device and not of the SE. Then, the process judgment section 110 of the SE can calculate an amount to be required by searching information of date, time, and place of the ticket or the schedule using, as a key for the search, a date and time obtained from the service terminal that executed the ticket gate entry process; by predicting a deboarding station by place information that corresponds to the date and time close to the search; and by referring to the fare database. A threshold is then set according to this amount, so that the user can get to know at a glance whether or not the balance of the value is sufficient for an exit process at a ticket gate of the station that he/she is heading for.

As described above, a user is notified clearly that a value has been subtracted. Therefore, it is possible to remove user's anxiety that a value may be used without his/her knowing; and if a value is subtracted when a user does not expect it to be subtracted, the user can become aware instantly that this is an improper adjustment. A user is also notified clearly that the balance of the value has become less than a threshold, and he/she is encouraged to do a charge. Therefore, it is possible, for example, to reduce the number of users who are stopped at ticket gates and to ensure a smooth flow of users through them. Furthermore, ease-of-use is improved if a user is notified about the insufficient balance according to a threshold customized for the user.

Described below are examples of services which execute a process for an entry into a place or a room. In the examples, an accompanying process, which is not essential to a process to permit an entry into a place or a room (a user may therefore not be aware of it), is also executed, and this accompanying process may change data which guides the user to the next activity.

Figure 8:
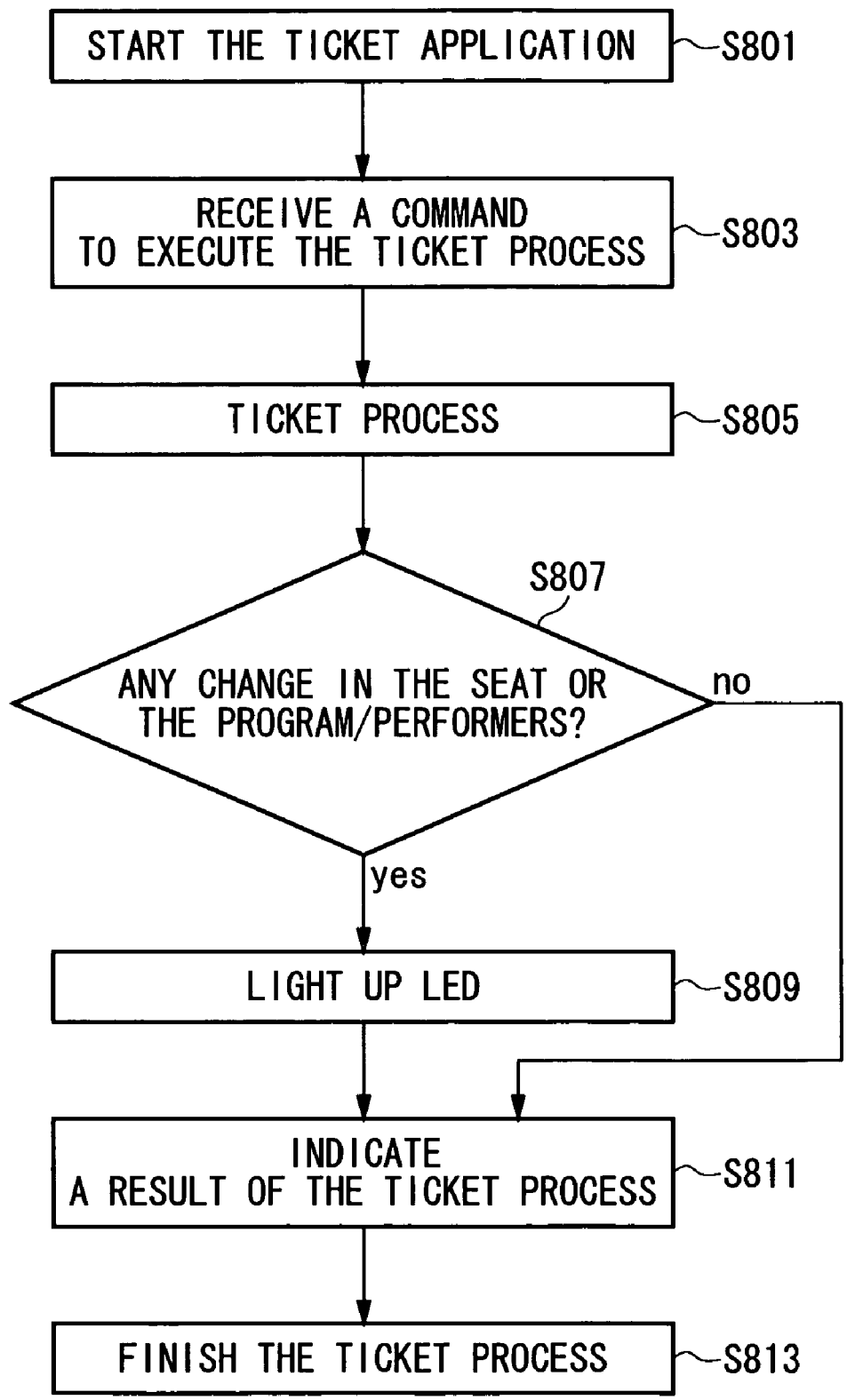
FIG. 8 is an example of operation of an SE's control section when a user is notified according to a change of a place or content.

For example, in order to go through (entry process) an entrance of an event venue, a check-in counter at an airport, or the like, a user is asked to show a fact that he/she purchased the ticket in advance. For this purpose, a ticket application exists in the SE, and the ticket data (information that can identify date and time of the event or flight, a name of the event or flight, a place of the venue or a name of the airport to board, or the like) is stored there under secure protection. FIG. 8 shows an example of an operation, in such an entry service using a ticket, of the control section 102 comprising the process judgment section 110 of the embodiment.

First, when a user puts the portable device mounted with the SE over a service terminal, the control section 102 of the SE receives a command to start a ticket application (e.g., application 112) that corresponds to the service provided by the service terminal, and starts the ticket application. (S801) Then, it receives, via contactless communication with the service terminal, a command to execute a ticket process. (S803) According to the command, it executes the ticket process (e.g., sends the ticket data to the service terminal and receives accompanying data which is sent back from the service terminal in response). (S805) Meanwhile, the service terminal judges whether to permit or reject the entry of the user based on the ticket data sent from the SE. The accompanying data sent back from the service terminal includes, for example, information of a seat finally allocated for the user (this is called place information). It may also include information of a finally confirmed program or performers in a case of an event, and may also include information of a finally confirmed flight in a case of a flight (these are called content information). The accompanying data received via the contactless I/F 106 may be written into the memory 104 of the SE, but if it is not highly confidential data like a ticket data, it may be written into the memory 144 of the portable device via the contact I/F 108.

The above-mentioned command to execute the ticket process is received and executed by the application 112 under control of the control section 102, and the process judgment section 110 judges whether any one of the place information and the content information, which are previously (at the time of purchasing the ticket or afterwards as appropriate) written into the memory of the SE or of the portable device, has been changed or not. (S807) A case, where at least one of the place information and the content information is not written into the memory of the SE or of the portable device and it is first written into due to the ticket process, is regarded the same as the case where previously written information has been changed. When judged that there has been a change, the LED or the like of the portable device is made to light up to attract a user's attention (S809), and when judged that there has not been a change, the ticket process finishes without further action. (S813) In either judgment, the result of the ticket process (e.g., the accompanying data sent back from the service terminal to the SE) may optionally be indicated on the display of the portable device or the like before the ticket process finishes. (S811)

The above-described control shown in FIG. 8 can also be applied to an entry service that does not use a ticket. In an example of such a service, when a user visits a building, data to identify the user, which is securely stored in the SE, is sent to a service terminal located at the gate of the building, and permission is given only to a user who is scheduled to visit there. At that time, if the service terminal is to send back accompanying data, showing a room in the building in which a meeting the user is scheduled to attend will be held, to the SE of the user who are permitted to enter, the process judgment section 110 can attract the user's attention by lighting up the LED or the like of the portable device when the place information previously written into the memory of the SE or of the portable device is changed due to the accompanying data, and can let the LED or the like remain unlit when there is not any change or new information.

Figure 9:
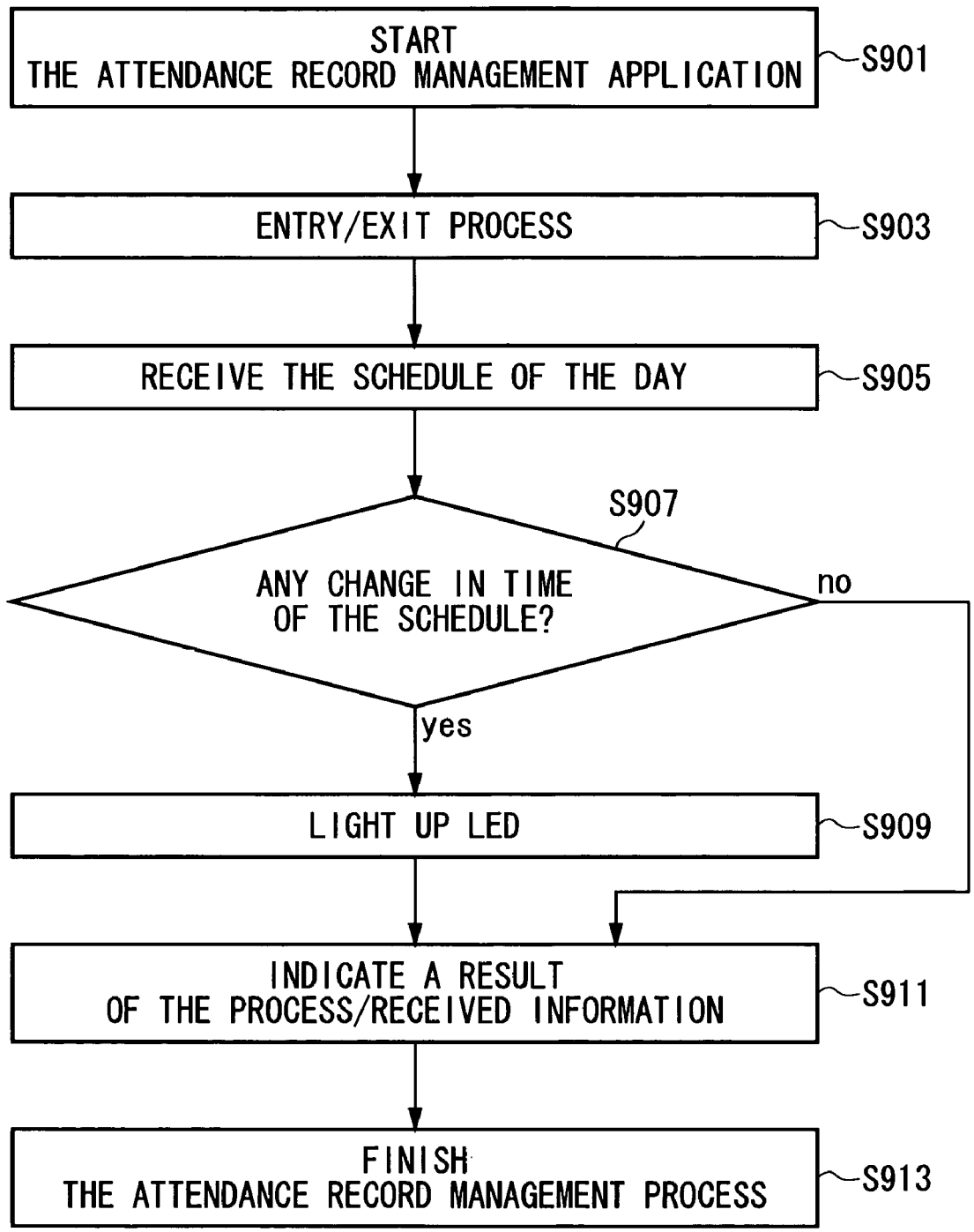
FIG. 9 is an example of operation of an SE's control section when a user is notified according to a change of a time.

Another example is a case where a user goes through an entrance/exit of a place where entry/exit management is required, such as an office or a factory. In order to go through such a place, the user needs to show that he/she is, for example, an employee of the company who is authorized to enter into the room. In such a situation, it is convenient if an attendance record, along with the entry/exit, is managed by the same application. For this purpose, an attendance record management application is to exist in the SE, and data of employees is stored there under secure protection. FIG. 9 shows an example where the control section 102 comprising the process judgment section 110 of the embodiment operates in such a service of managing arrival at and departure from work with an employee card.

First, when a user puts the portable device mounted with the SE over a service terminal, the control section 102 of the SE receives a command to start an attendance record management application (e.g., application 112) that corresponds to the service provided by the service terminal, and starts the attendance record management application. (S901) Then, based on data of employees sent from the SE via contactless communication with the service terminal, the service terminal executes an entry/exit process and management of arrival at and departure from work (S903), and a confirmed schedule of the employee on that day is sent from the service terminal to the SE as accompanying data. (S905) The process judgment section 110 judges whether or not schedule information (time information, particularly here) previously written into the memory of the SE or of the portable device has been changed due to the accompanying data.

(S907) A case, where the time information is not written into the memory of the SE or of the portable device and it is first written into due to receiving the accompanying data, is regarded the same as the case where previously written information has been changed. When judged that there has been a change, the LED or the like of the portable device is made to light up to attract a user's attention (S909), and when judged that there has not been a change, the attendance record management process finishes without further action. (S913) In either judgment, the result of the attendance record management process or the received accompanying data may optionally be indicated on the display or the like of the portable device before the attendance record management process finishes. (S911)

When subjects of judgment differ depending on each application as described above, judgment methods may also be different so that the process judgment section is implemented for every application as shown in FIG. 4B. But even in this case, it can be implemented for common use as shown in FIG. 4A. For example, if the process judgment section 110 is instructed how to read out each data handled by each application (e.g., places where the data is stored) so as to obtain data before and after each process executed by each application, it can judge whether a value has been subtracted due to a process or not by at least comparing figures before and after the process when the data are numerical values. When the data are character strings, it can also judge whether the information of place, content, time, or the like, which guides a user to the next activity, has been changed or not by comparing character strings before and after the process.

In the example described above, the portable device is instructed to notify the user when there has been a change about which the process judgment section decides to attract a user's attention. The configuration may be such that the control section 102 sends some data (a certain byte of which is zero) to the portable device regardless of details of a change after a process via contactless communication finishes, and that the certain byte of the above data to be sent to the portable device is changed to 1 (one) when there has been a change about which the process judgment section 110 decides to attract a user's attention. In this case, the control section 142 of the portable device receives the data and operates such that it notifies a user using the display section 150 when the certain byte is 1 (one), and does not notify a user when the certain byte is 0 (zero).

Judgment in Portable Device

The second embodiment will now be described in detail with reference to drawings.

In this embodiment, an IC module mounted on the portable device is tamper resistant, which is required for an IC card function, and can maintain confidentiality of a program or important data contained in the IC module. Therefore, the IC module of this embodiment is called a secure element (SE).

Figure 10:
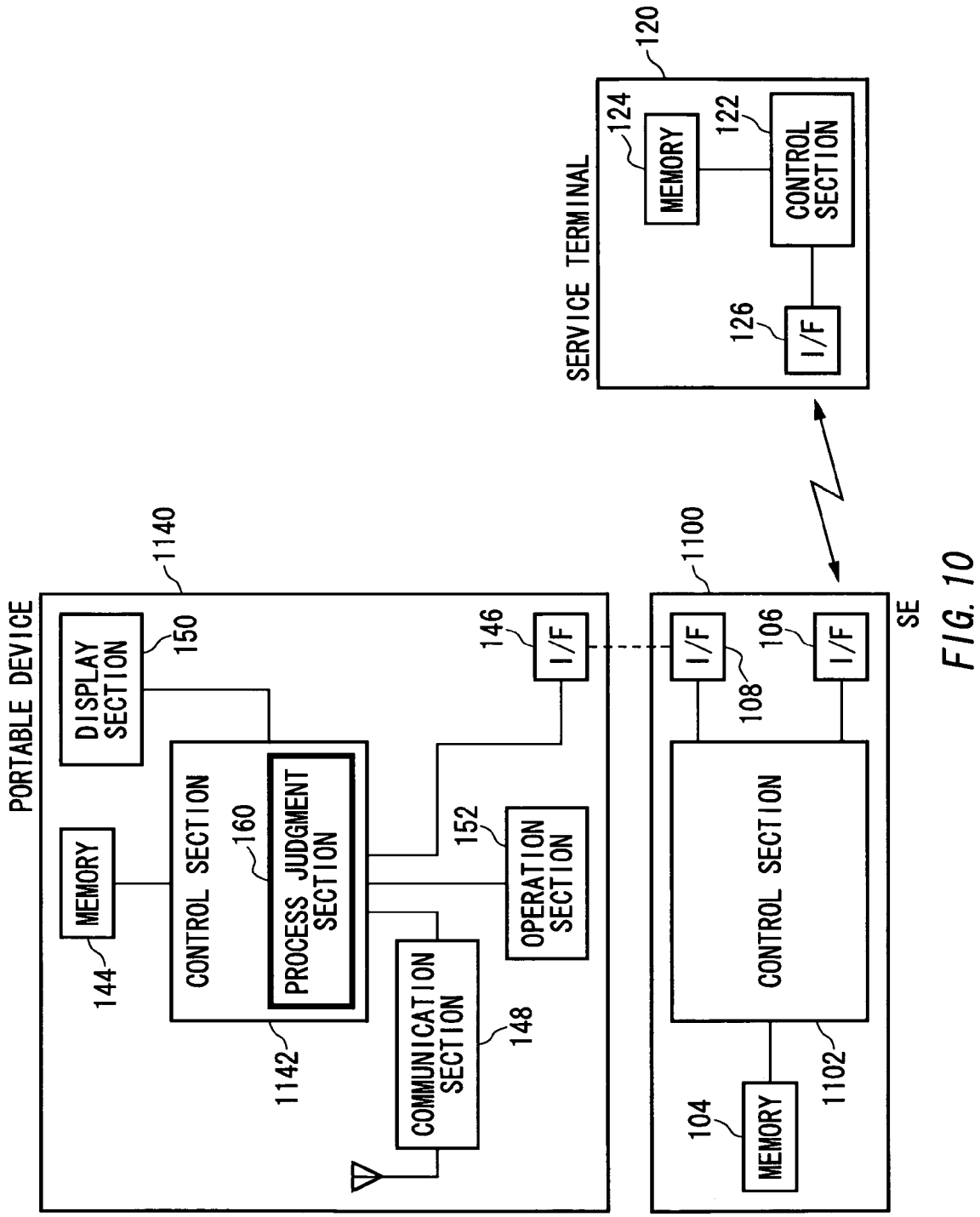
FIG. 10 is a configuration example of a secure element (SE), a service terminal, and a portable device related to a second embodiment.

FIG. 10 is a configuration example of a secure element (SE) 1100, a service terminal 120, and a portable device 1140 related to the embodiment. The SE 1100 may be mounted on an IC card which is attached to the portable device 1140 removably and re-attachably or may be incorporated in the portable device. In the former, the SE 1100 composes the IC card, while in the latter the SE 1100 and the portable device 1140 as a whole is called the portable device.

The SE 1100 comprises a control section 1102 that controls operation of an application program in the SE and controls SE's communication with other devices, and a memory 104 that stores an application program for receiving a service, data related to a service, or the like. The control section 1102 shows a functional block and is actually realized by CPU, EEPROM, or the like. The SE 1100 also has an interface (contactless I/F) 106 for contactless communication with the service terminal 120 and an interface (contact I/F) 108 for connecting with the portable device 1140. The control section 1102 also has a function to send information, such as a result or details of the process by an application program in the SE, to the control section 1142 of the portable device 1140 via the contact I/F 108.

The service terminal 120 is set at a certain place like vending machines, check-out counters, ticket gates at stations, check-in counters at airports, entrances and exits of concert venues, gates of offices and factories, or the like. It comprises a control section 122 that controls operation of an application program in the service terminal and controls service terminal's communication with other devices, and a memory 124 that stores an application program for providing a service, related data, or the like. The service terminal 120 also has an interface 126 that can do contactless communication with the SE 1100, so when a user passes a certain place, he/she can receive a certain service by bringing the carrying SE 1100 near to the service terminal 120.

The portable device 1140 comprises a control section 1142 that controls operation of the portable device and its communication with other devices, a memory 144 that stores application programs to make the portable device execute various operations, related data, or the like, a communication section 148 that communicates with a cell telephone network, and a contact I/F 146 that can connect with the contact I/F 108 of the SE 1100. The portable device 1140 also comprises an operation section 152 that accepts operations by the user via a keypad, button, microphone, or the like, and a display section 150 that outputs to the user by a display, LED indicating an incoming call, other exclusive indicator light, or the like of the portable device. The output from the display section 150 is not limited to an output appealing to user's sense of sight. It may be an output appealing to the sense of hearing (a speaker or a headphone jack) or to the sense of touch (a vibration function). A process judgment section 160 has, as described later, a function to judge information such as a result or details of the process that the control section 1142 received from the SE 1100 and send an output command to the display section 150.

Figure 11:
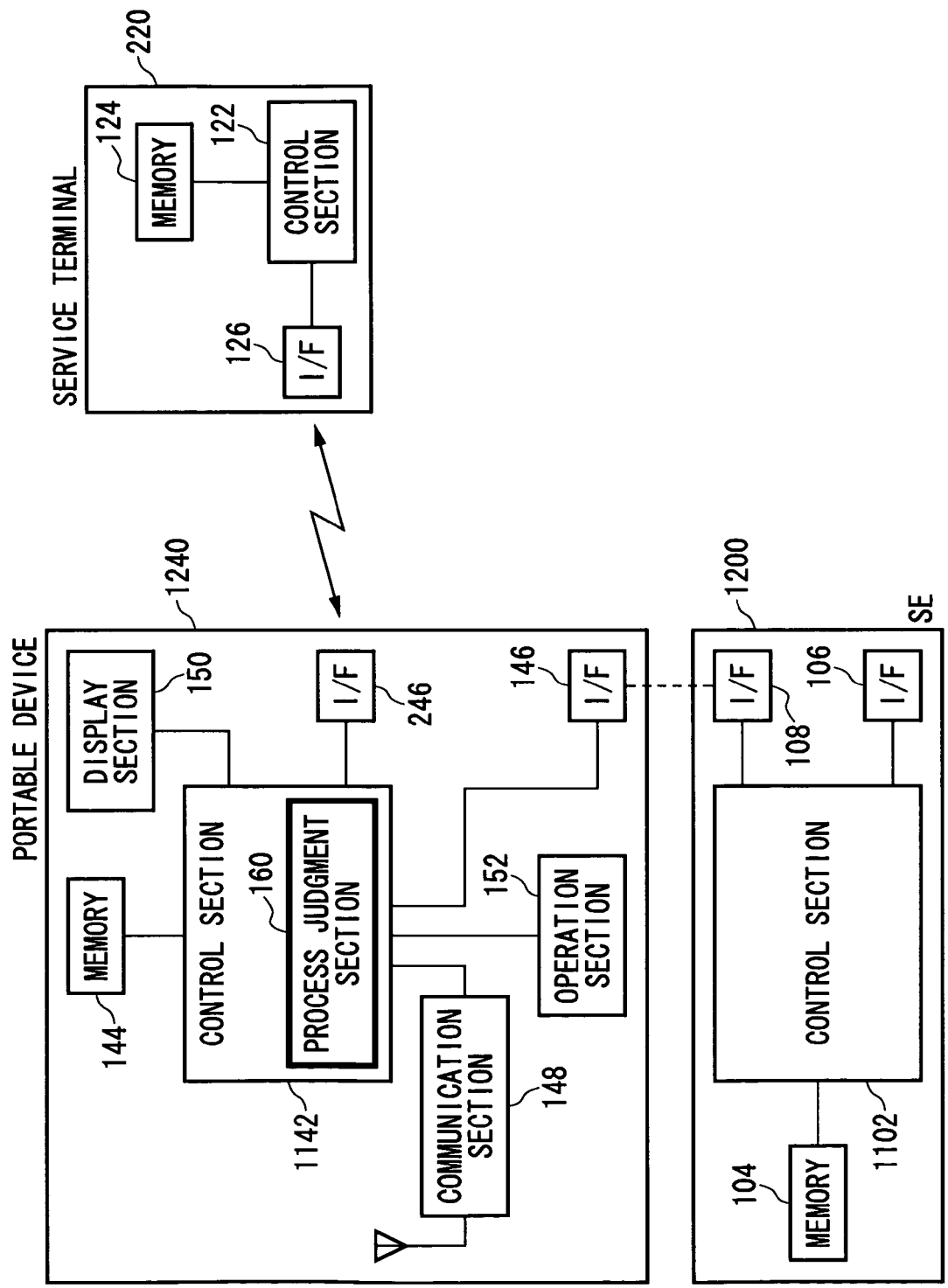
FIG. 11 is another configuration example of an SE, a service terminal, and a portable device related to the second embodiment.

FIG. 11 shows another configuration example of the embodiment. A secure element (SE) 1200 is the same as the SE 1100 of FIG. 10 except for not having the contactless I/F 106. A portable device 1240 is the same as the portable device 1140 of FIG. 10 except for being added with a contactless I/F 246. A service terminal 220 is the same as the service terminal 120 of FIG. 10 except that the contactless I/F 126 dose contactless communication with the contactless I/F 246 of the portable device 1240. The SE 1200 does contactless communication with the service terminal 220 by using the contactless I/F 246 of the portable device 1240 via the contact I/F 108 and 146. Incidentally, the SE 1200 may be mounted on an IC card which is attached to the portable device 1240 removably and re-attachably or may be incorporated in the portable device. In the former, the SE 1200 composes the IC card, while in the latter the SE 1200 and the portable device 1240 as a whole is called the portable device.

FIG. 12A and FIG. 12B shows how an appropriate notice is given to a user regarding each process of a service executed by "touch and go" via the above-mentioned cooperative communication among three parties of the SE, the service terminal, and the portable device. Here, the embodiment will be described taking as an example a service where a process was executed in a password-less manner even in a case of consuming a value (monetary value) and so the value may have decreased without a user knowing it.

The portable device of the example, in conjunction with the SE, clearly notifies a user about consumption of the value when a process is executed via contactless communication with the service terminal. For this purpose, a result, details, or the like of the process executed in the SE is notified to the portable device after the contactless communication process finishes, and the process judgment section 160 of the portable device judges whether a process consuming (subtracting) a value has been executed or not, and if it has, a user's attention is attracted by, for example, lighting up an LED of the display section 150. When a process of deletion or cancellation, which corresponds to a subtraction, is executed, an instruction to notify (e.g., command to light up the LED) is given to the portable device. In this way, even for just one service, a notice is given depending on details of the process executed in the SE.

In an example of a service at ticket gates of railroads, the SE has a ticket gate application (an application program) in which commuter pass data and e-money are stored under secure protection. There are two cases for the ticket gate application: one is when only the commuter pass data is used; and the other is when fare adjustment by e-money occurs at a place out of the section of the commuter pass. When a user gets on or off within the section of the commuter pass, an LED of the portable device remains unlit, because the portable device side can get to know that the value has not been consumed. On the other hand, when a fare is adjusted by e-money at a ticket gate machine at a time of entering or exiting the ticket gate located out of the section of the commuter pass, a user is notified with a clear indication such as the LED of the portable device lighting up in red, because the portable device side can get to know that the value has been consumed.

In an example of a service using a bonus point card, the SE has a bonus point application (an application program) in which data of current bonus points are stored under secure protection. There are two cases for the bonus point application: one is when transactions are completed by accumulating points; and the other is purchasing at a discount using the points. When a user accumulated points, an LED of the portable device remains unlit, but when the transaction was completed using the points, a user is notified with a clear indication such as the LED lighting up in blue.

FIG. 12A shows a case where a process-A in which a value is not consumed, such as the process at a ticket gate using a commuter pass or the process accumulating points, is executed via contactless communication between an application 112 (the ticket gate application or the bonus point application) of the SE and an application 128 of the service terminal. This contactless communication is done via the contactless I/F 106 and 126. The control section 1102 controls execution of the application 112 in the SE and communication via the contactless I/F 106, and the control section 122 controls execution of the application 128 in the service terminal and communication via the contactless I/F 126.

The control section 1102 of the SE can pick out information to be sent to the portable device out of a process executed by the application 112 whose operation is controlled by the control section 1102. The application 112 may instruct the control section 1102 which information to chose, or the control section 1102 may be made in advance so as to pick out certain information. The control section 1102 acquires, for example, a value which will be securely written into as a result of a process, and can send it to the control section 1142 of the portable device. In addition to this, it may acquire a value before the process and send information of a set of the values before and after the process or information of a difference of the values before and after the process. It may also send a type of the process executed (subtraction or addition) and the amount (how much is subtracted/added) or send only the type of the process executed. In the case of sending a type of the process executed, the type may be sent only when the value has been changed, and a type of the process indicating that no change was made may be sent when no change was made. Then, the control section 1142 of the portable device receives the above-mentioned information sent, and the process judgment section 160 judges whether a process that consumes a value has been executed or not based on the information received by the control section 1142.

In FIG. 12A, an instruction to the display section 150 of the portable device is not given because the value is not consumed as a result of the process-A. However, depending on an application 154 implemented in the portable device, a notice of the result of the process may be required even if the value is not consumed. In such a case, not the process judgment section 160 but the control section 1142 of the portable device notifies the result of the process-A to the application 154 using the information received, so that the current value (after the process) or other information is indicated on a display or the like which is different from the LED or the like used by the process judgment section 160 to attract a user's attention. The display section 150 used by the judgment section 160 to attract a user's attention can be used as the display or the like used to indicate a result of a process by the application 154 of the portable device, but in this case, an indication to attract a user's attention may be more eye-catching than an indication of a result of a process, for example, by flashing the whole display or the like.

FIG. 12B shows a case where a process-B in which a value is consumed, such as the fare adjustment for a route to/from a place out of the section of the commuter pass or the process using points, is executed via contactless communication between the application 112 (the ticket gate application or the bonus point application) of the SE and an application 128 of the service terminal. The control section 1102 of the SE picks out information such as the value, a change in the value, or a type of a process executed by the application 112, and sends it to the control section 1142 of the portable device. The process judgment section 160 of the portable device detects, based on the information that the control section 1142 received, that the process consuming the value has been executed, and sends an instruction to the display section 150 (e.g., LED) of the portable device to attract a user's attention. In addition to this, the control section 1142 of the portable device may notify the result of the process-B to the application 154 of the portable device based on the received information so that the current value (after the process), an adjusted amount (a difference of the values before and after the process), or other information is indicated on a display or the like of the portable device.

In addition to the above-mentioned result of a process or content information, information to be sent from the control section 1102 of the SE to the control section 1142 of the portable device may include information that can identify an application program that executed the process. In this way, when the information with which a fact that the value has been consumed can be detected is received, the process judgment section 160 of the portable device can distinguish whether the application that consumed the value is a ticket gate application or a bonus point application, or the like. As described later, it is also possible for each application to have a different criterion of judgment or the like. Such identification of application programs is effective, not only in a case where a plurality of application programs exist in one IC card, but also in a case where a user uses IC cards by replacing one with another. For example, when different services, like a ticket gate application and a bonus point application, are implemented in different OSs, there will be an IC card for every service, and a user will have IC cards as many as the number of services he/she wants to use. When these IC cards are replaced, the portable device side can identify an application program of the installed IC card. Incidentally, when one IC card corresponds to one application (or service), identification information of the IC card may be sent from the SE to the portable device.

The control section 1102 of the SE exists in isolation from other individual applications of the SE and can control all these applications in common. Therefore, in a case where the control section 1102 itself is made up so as to pick out certain information without being instructed by the application 112, even when a new application that provides a different service is added to the same SE, the result of a process executed by the new application or its content information can be sent to the portable device side in the same way as the result of a process executed by the existing application or its content information is sent to the portable device side.

Meanwhile, in the portable device side, when the above-mentioned result of a process or content information is sent and comes in, the process judgment section 160 judges the received information based on a common criterion of judgment regardless of a difference of applications executed in the SE or a difference of the SE connected with the contact I/F. Therefore, notice that attracts a user's attention can be easily realized with its consistency being maintained. In this way, a user's attention will be attracted consistently for a process that consumes a value using one application (e.g., a ticket gate application) and also for a process that consumes a value using another application (e.g., a bonus point application). This consistency is maintained when the SE changes, that is, when an IC card is pulled out and another IC card is inserted, so the user will not get confused.

On the other hand, in a case where the control section 1102 of the SE picks out information according to an instruction from the application 112, there is a possibility that the result of a process or content information that the portable device side receives will be different depending on applications. Even in this case, if the process judgment section 160 of the portable device receives information that can identify an application program that executed the process, it can make a judgment adaptable to each application.

Figure 13:
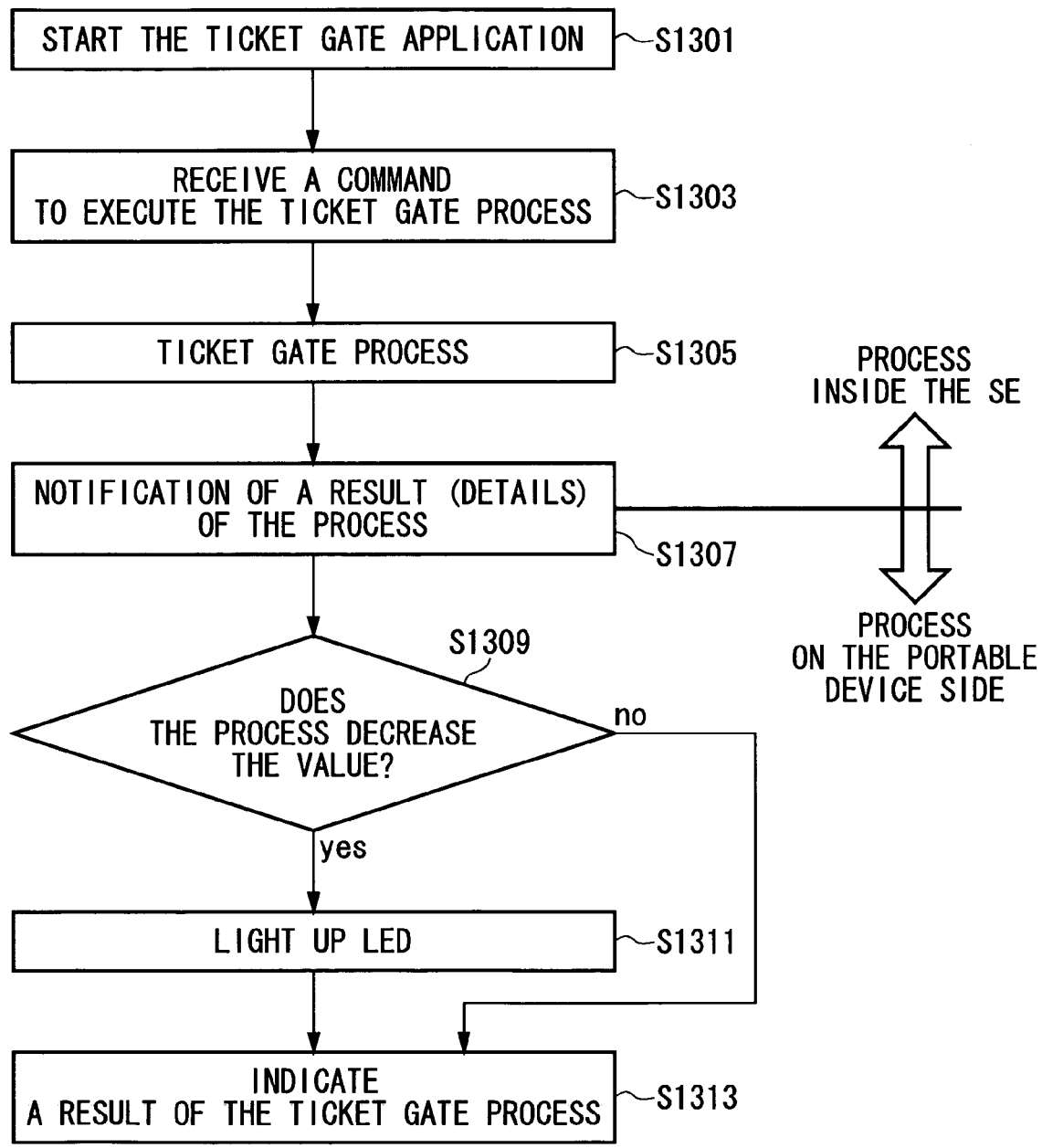
FIG. 13 is an example of operation of an SE's control section and a portable device's control section when a user is notified according to value consumption.

FIG. 13 illustrates the above-mentioned cooperative operation between the control section 1102 of the SE and the process judgment section 160 of the portable device, taking a ticket gate application as an example. First, when a user puts the portable device mounted with the SE over the service terminal, the control section 1102 of the SE gets to know that the service terminal is located at a ticket gate of a certain railroad and starts the ticket gate application (e.g., application 112) that corresponds to the service. (S1301) Then, a command to execute a ticket gate process is received via contactless communication with the service terminal. (S1303) According to the command, the ticket gate process (e.g., data of the boarding station and commuter pass is sent to the service terminal; in response, an amount of the adjusted fare is sent back from the service terminal; and this amount is deducted from a value in the SE for the railroad use) is executed. (S1305) The above-mentioned command to execute the ticket gate process is received and executed by the application 112 under control of the control section 1102, and the control section 1102 send information such as the result or details of the process to the portable device side. (S1307) The process judgment section 160 of the portable device judges, based on the information received, whether or not the value in the SE has been reduced. (S1309) When it judges that the result was a subtraction, the LED or the like of the portable device is made to light up to attract a user's attention (S1311) and the process finishes, and when it judges that the result was not a subtraction, the process finishes without further action. In either judgment, the result of the ticket gate process may optionally be indicated, based on the information received, on the display or the like of the portable device before the process finishes. (S1313)

Shown in FIG. 13 was an example of sending a notice to attract a user's attention whenever a process that consumes a value is executed. But, if the number of the notice is considered too many and annoying, the notice can be sent only when it is considered to be really needed. When is considered to be really needed differs depending on a nature of the application or the like, and it will be set by a service provider or the like, or by a user himself/herself. Various setting examples will be described below.

First, in cases where a value is consumed, one possible judgment method is such that the display section of the portable device is lit when an amount of the value subtracted is large (e.g., more than 500 yen), but that the display section remains unlit when the amount subtracted is small (e.g., 500 yen or less). And in cases where a value is consumed, another possible judgment method is such that the display section of the portable device is lit when a percentage of an amount subtracted to a total amount of the value is large (e.g., when the balance is 5000 yen and the amount subtracted is 501 yen or more, which is more than 10 percent), but the display section remains unlit when the percentage of the amount subtracted is small (e.g., 10 percent or less). An amount or a percentage subtracted, which is to be a threshold, in these methods may be common to a plurality of applications or may be different for each application.

Figure 14:
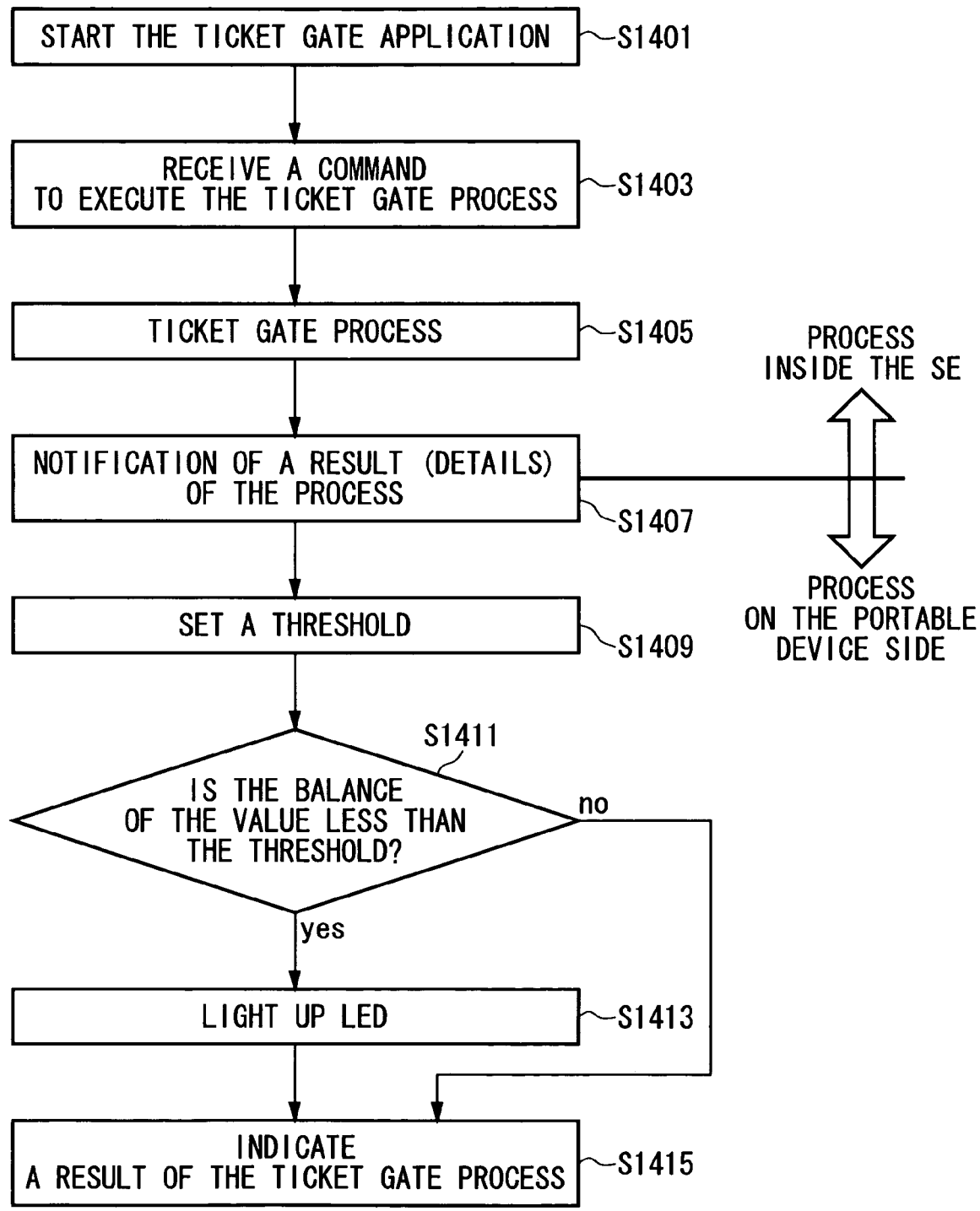
FIG. 14 is an example of operation of an SE's control section and a portable device's control section when a user is notified according to the value balance.

Still another judgment method is such that the display section of the portable device is lit when a process reduces the balance of the value to a threshold or less, but the display section remains unlit otherwise. FIG. 14 illustrates, taking a ticket gate application as an example, a cooperative operation with the control section 1102 of the SE when the portable device comprises the process judgment section 160 using this judgment method. Threshold values to be a standard of judgment are held, for example, by the memory 144 which the process judgment section 160 refers to as shown in FIG. 7A. These values can be set optionally by a user for every service, or for every process or may be values provided by a service provider or the like. Incidentally, a threshold management table shown in FIG. 7A may be held as data having a TLV structure.

When a user puts the portable device mounted with the SE over a service terminal located at a gate of a certain railroad, the control section 1102 of the SE receives from the service terminal a command to start a ticket gate application (e.g., application 112) for railroad A that corresponds to the service, and starts the ticket gate application. (S1401) Then, it receives a command to execute a ticket gate process via contactless communication with the service terminal. (S1403) According to the command, it executes the ticket gate process (e.g., data of the boarding station and commuter pass is sent to the service terminal; in response, an amount of the adjusted fare will be sent back from the service terminal; and this amount will be deducted from a value in the SE for the railroad use). (S1405) The control section 1102 sends information of the result or details of the executed process to the portable device side. (S1407) At that time, if a threshold for judgment is to be changed for each application as shown in FIG. 7A, information to identify the application that executed the process is sent to the portable device side as well. If a threshold is to be changed depending on whether the executed process is an entry process or exit process as shown in FIG. 7A, information to identify the process is sent to the portable device side as well. Incidentally, in a case that outputting even the information identifying an entry/exit process to the outside of the SE is not desirable for security reasons, a threshold management table may be made such that one threshold is used for one application, for example, using a larger figure of either the figure at the time of entry or the figure at the time of exit.

The process judgment section 160 of the portable device gets to know, based on the received information, that the application that executed the process is the ticket gate application for the railroad A and, if security permits, gets to know that the executed process is for exiting the ticket gate. Based on this information and by referring to the threshold management table of FIG. 7A, 150 yen is derived as a threshold. (S1409) Meanwhile, in a case that the application that executed the process is a ticket gate application for a railroad B, the process judgment section 160, if security permits, gets to know that the executed process is for entering the ticket gate. Based on this information and by referring to the threshold management table of FIG. 7A, 120 yen is derived as a threshold. These thresholds are set to allow a user to know in advance, for example, of the following situation: if a user will not have done a charge process that increases an amount of e-money in the SE to increase the value, the user will not be able to use a similar service terminal the next time due to the insufficient balance. In this example, a threshold at the time of exiting a ticket gate (the time of getting off) may be set based on a minimum fare which will be required to enter (get on a train of) the same railroad the next time, and a threshold at the time of entering a ticket gate (the time of getting on) may be set based on an amount predicted suitably as an additional fare which will be required to get off the train.

The process judgment section 160 now judges, based on the information that the portable device side received, whether or not the balance of a value in the SE has become less than the threshold which is set as above due to the above-mentioned ticket gate process. (S1411) When it judges that the balance has become less than the threshold, the LED or the like of the portable device is made to light up to attract a user's attention (S1413) and the process finishes, and when it judges that the value has not become less, the process finishes without further action. In either judgment, the result of the ticket gate process may optionally be indicated, based on the received information, on the display or the like of the portable device before the process finishes. (S1415)

Moreover, when the balance is judged to have become less than the threshold, in addition to attracting a user's attention as mentioned above, an on-line charge application may be started automatically at the time that the process finishes, allowing a user to do an appropriate charge process promptly. The charge process can be executed via contactless communication between a service terminal that does a charge and the SE. It can also be executed by communication between the SE and a remote terminal such as a bank service terminal via the communication section 148 of the portable device. The latter is called an on-line charge process.

There is a possibility that the thresholds shown in FIG. 7A needs to be changed due to a revision of the train fare. However, they may be changed automatically by the process judgment section 160 of the portable device communicating, via the communication section 148, with a fare database server or the like connected to the wireless network and acquiring a revised minimum fare or the like.

A threshold as a standard of judgment can also be calculated dynamically such that it would be a customized figure for each user. (S1409) FIG. 7B shows an example of the calculated data or the data used as a basis of calculation in this case. Data in the FIG. 7B is to be held by the memory 144 which is used by the process judgment section 160.

One example is where a trend of user's value consumption is held as a management table and a threshold is updated dynamically. For example, as shown in FIG. 7B as the average consumption value, an average of the consumed value is held for every day of the week and for every time frame. This data can be derived, for example, by memorizing in the memory 144 information of date and time which are obtained from a clock inside the portable device at the time that the result of a process or content information is received from the SE and information of an amount of the consumed value, and by calculating an average of the memorized consumed values for every day of the week and for every time frame in the past few weeks or few months. Incidentally, the value consumed at the time of the ticket gate exit process is an amount of additional fare. The sum of this additional fare and the minimum fare deducted at the time of the entry process, that is, a fare of a section from boarding to deboarding, may be memorized instead. Then, the process judgment section 160 that operates according to FIG. 14 can read out the average of the consumed value of corresponding day of the week and time frame based on the present date and time (at the time of judgment) indicated by the clock inside the portable device, and can set a threshold to be a standard of judgment based on the figures read. A threshold may also be set such that when the current process is a ticket gate exit process, it is set based on the minimum fare of the same railroad by referring to FIG. 7A, and when the current process is a ticket gate entry process, it is set based on the additional fare which will most likely be needed at the time of deboarding by referring to FIG. 7B.

As shown in FIG. 7B as the frequently boarding/deboarding sections, some of high-ranking data regarding sets of boarding and deboarding stations which were used for a plurality of times and the amount of money to be required may be held. This data can be derived, for example, by sending from the SE side to the portable device side information of boarding and deboarding stations (if the transmission of this information to the outside of the SE is not a problem from a security point of view) which are obtained at a service terminal every time a ticket gate exit process is executed at a service terminal on a user's getting off a train; then by memorizing the information in the memory 144; and by counting how many times the same set of boarding and deboarding stations has been memorized in the past few weeks or few months. Incidentally, as an amount of the fare required for a set of boarding and deboarding stations, an amount of a value consumed at the time of the ticket gate exit process (additional fare) for the corresponding boarding and deboarding may be memorized; or the sum of this additional fare and the minimum fare, that is, a fare of a section from boarding to deboarding may be memorized; or a fare database may be consulted for the fare of the corresponding section from boarding to deboarding. Then, the process judgment section 160 that operates according to FIG. 14 can search frequently boarding/deboarding sections of FIG. 7B using, as a key for the search, information of the boarding station that the SE obtains from the service terminal and (if there is no problem from a security point of view) sends to the portable device side when the executed ticket gate process is an entry process; and can set a threshold to be a standard of judgment based on the amount of the fare required for the most frequently boarding/deboarding section among those that match the key.

Another example is that a threshold is dynamically updated in conjunction with other registered data in the portable device or on-line. For example, a conjunction with a fare database stored in the memory 144 or in a remote database server that can be accessed via the communication section 148 of the portable device is possible. To be specific, when a user boarded/deboarded at a place out of the section of the commuter pass, an amount of fare from the boarding/deboarding station to the section of the commuter pass can be calculated by referring to the fare database, based on the section of the commuter pass shown in the commuter pass information in FIG. 7B and on information of the station where a user is at present (at the time of judgment). A threshold is then set according to this amount, so that the user can get to know at a glance whether or not the balance of the value is sufficient to return to the section of the commuter pass when he/she uses a station out of the section of the commuter pass. Here, when the information of the station where the service terminal that the user put the SE over is located is sent from the SE to the portable device, the boarding/deboarding station can be identified based on that information, or otherwise it can be identified based on place information of the portable device obtained by the GPS or the like.

In a case where the portable device has a schedule management application, a memo pad application, an e-mail application, or the like, a conjunction with information of date, time, and place which exists in the data managed by these applications, is also possible. For example, the process judgment section 160 of the portable device can calculate an amount to be required by searching information of date, time, and place of the schedule or the like using, as a key for the search, the present date and time (at the time of consuming a value by the ticket gate entry process) indicated by the clock inside the portable device; by predicting a deboarding station by place information that corresponds to the date and time close to the search; and by referring to the fare database. A threshold is then set according to this amount, so that the user can get to know at a glance whether or not the balance of the value is sufficient for an exit process at a ticket gate of the station that he/she is heading for. Here, when the information of the station where the service terminal that the user put the SE over is located is sent from the SE to the portable device, the information of the boarding station used to calculate the amount can be identified based on that information of the station, or otherwise it can be identified based on place information of the portable device obtained by the GPS or the like, or based on the information included in the schedule or the like.

As described above, a user is notified clearly that a value has been subtracted. Therefore, it is possible to remove user's anxiety that a value may be used without his/her knowing; and if a value is subtracted when a user does not expect it to be subtracted, the user can become aware instantly that this is an improper adjustment. A user is also notified clearly that the balance of the value has become less than a threshold, and he/she is encouraged to do a charge. Therefore, it is possible, for example, to reduce the number of users who are stopped at ticket gates and to ensure a smooth flow of users through them. Furthermore, ease-of-use is improved if a user is notified about the insufficient balance according to a threshold customized for the user.

Described below are examples of services which execute a process for an entry into a place or a room. In the examples, an accompanying process, which is not essential to a process to permit an entry into a place or a room (a user may therefore not be aware of it), is also executed, and this accompanying process may change data which guides the user to the next activity. In the examples described below, not an amount of a value but a character string is sent from the control section 1102 of the SE to the control section 1142 of the portable device, and the process judgment section 160 of the portable device receives, for example, a set of the character strings before and after a process, and checks matching/mismatching of the character stings for the corresponding section.

Figure 15:
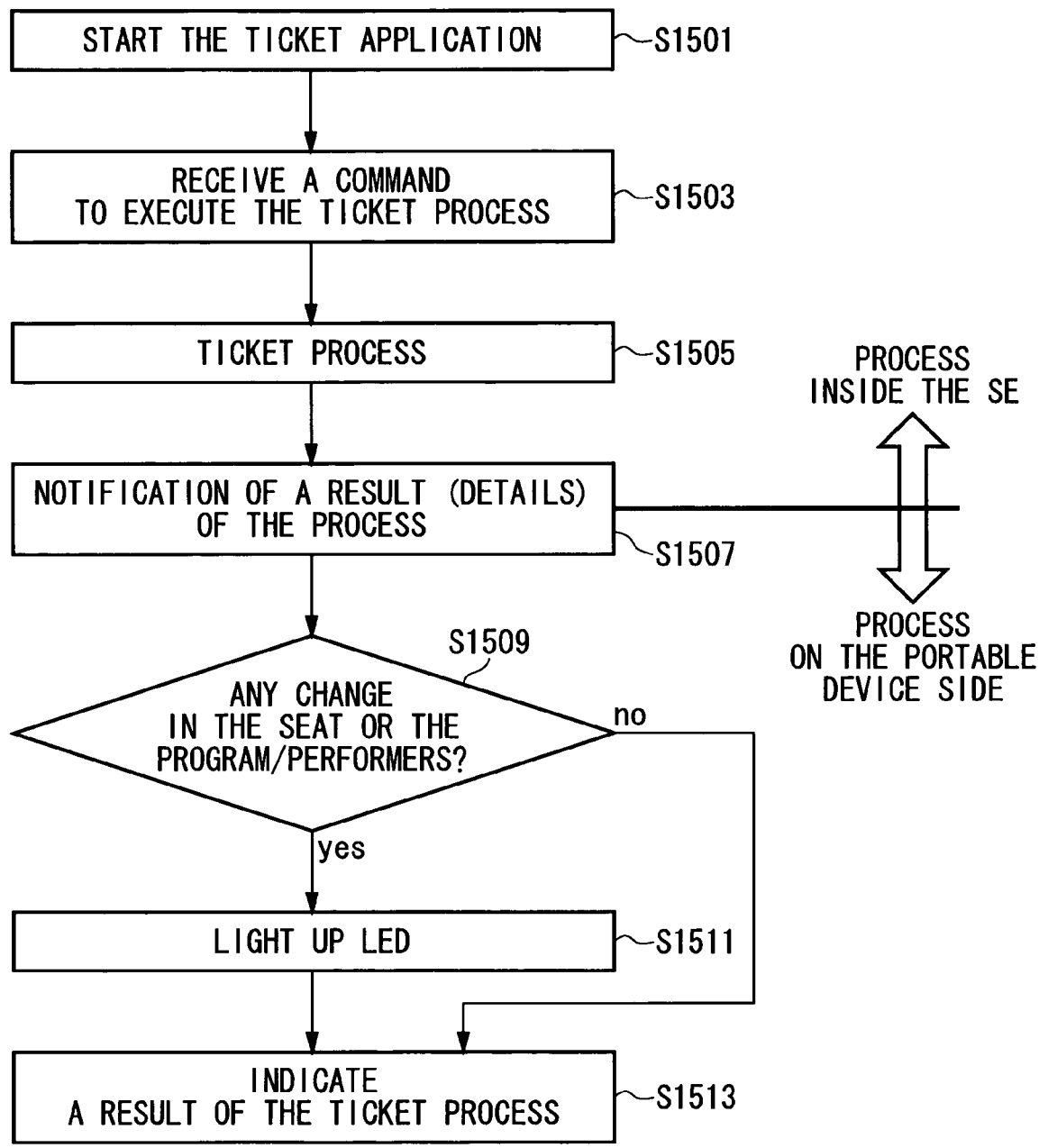
FIG. 15 is an example of operation of an SE's control section and a portable device's control section when a user is notified according to a change of a place or detail.

For example, in order to go through (entry process) an entrance of an event venue, a check-in counter at an airport, or the like, a user is asked to show a fact that he/she purchased the ticket in advance. For this purpose, a ticket application exists in the SE, and the ticket data (information that can identify date and time of the event or flight, a name of the event or flight, a place of the venue or a name of the airport to board, or the like) is stored there under secure protection. FIG. 15 shows an example of an operation that the process judgment section 160 of the portable device of the embodiment does in conjunction with the control section 1102 of the SE in such an entry service using a ticket.

First, when a user puts the portable device mounted with the SE over a service terminal, the control section 1102 of the SE receives a command to start a ticket application (e.g., application 112) that corresponds to the service provided by the service terminal, and starts the ticket application. (S1501) Then, it receives, via contactless communication with the service terminal, a command to execute a ticket process. (S1503) According to the command, it executes the ticket process (e.g., sends the ticket data to the service terminal and receives accompanying data which is sent back from the service terminal in response). (S1505) Meanwhile, the service terminal judges whether to permit or reject the entry of the user based on the ticket data sent from the SE. The accompanying data sent back from the service terminal includes, for example, information of a seat finally allocated for the user (this is called place information). It may also include information of a finally confirmed program or performers in a case of an event, and may also include information of a finally confirmed flight in a case of a flight (these are called content information). The accompanying data received via the contactless I/F 106 may be written into the memory 104 of the SE, but less confidential data of the accompanying data is sent to the control section 1142 of the portable device via the contact I/F 108 as a result of a process or content information. (S1507)

The process judgment section 160 of the portable device judges, based on the received information, whether any one of the place information and the content information, which are previously (at the time of purchasing the ticket or afterwards as appropriate) written into the memory 144 of the portable device, has been changed or not. (S1509) A case, where at least one of the place information and the content information is not written into the memory of the portable device and it is first written into due to the ticket process, is regarded the same as the case where previously written information has been changed. When judged that there has been a change, the LED or the like of the portable device is made to light up to attract a user's attention (S1511) and the process finishes, and when judged that there has not been a change, the process finishes without further action. In either judgment, the result of the ticket process (e.g., the accompanying data sent back from the service terminal to the SE) may optionally be indicated on the display or the like of the portable device before the process finishes. (S1513)

The above-described control shown in FIG. 15 can also be applied to an entry service that does not use a ticket. In an example of such a service, when a user visits a building, data to identify the user, which is securely stored in the SE, is sent to a service terminal located at the gate of the building, and permission is given only to a user who is scheduled to visit there. At that time, if the service terminal is to send back accompanying data, showing a room in the building in which a meeting the user is scheduled to attend will be held, to the SE of the user who are permitted to enter, the process judgment section 160 of the portable device, which received this accompanying data from the SE, can attract the user's attention by lighting up the LED or the like of the portable device when the place information previously written into the memory of the portable device is changed due to the accompanying data, and can let the LED or the like remain unlit when there is not any change or new information.

Figure 16:
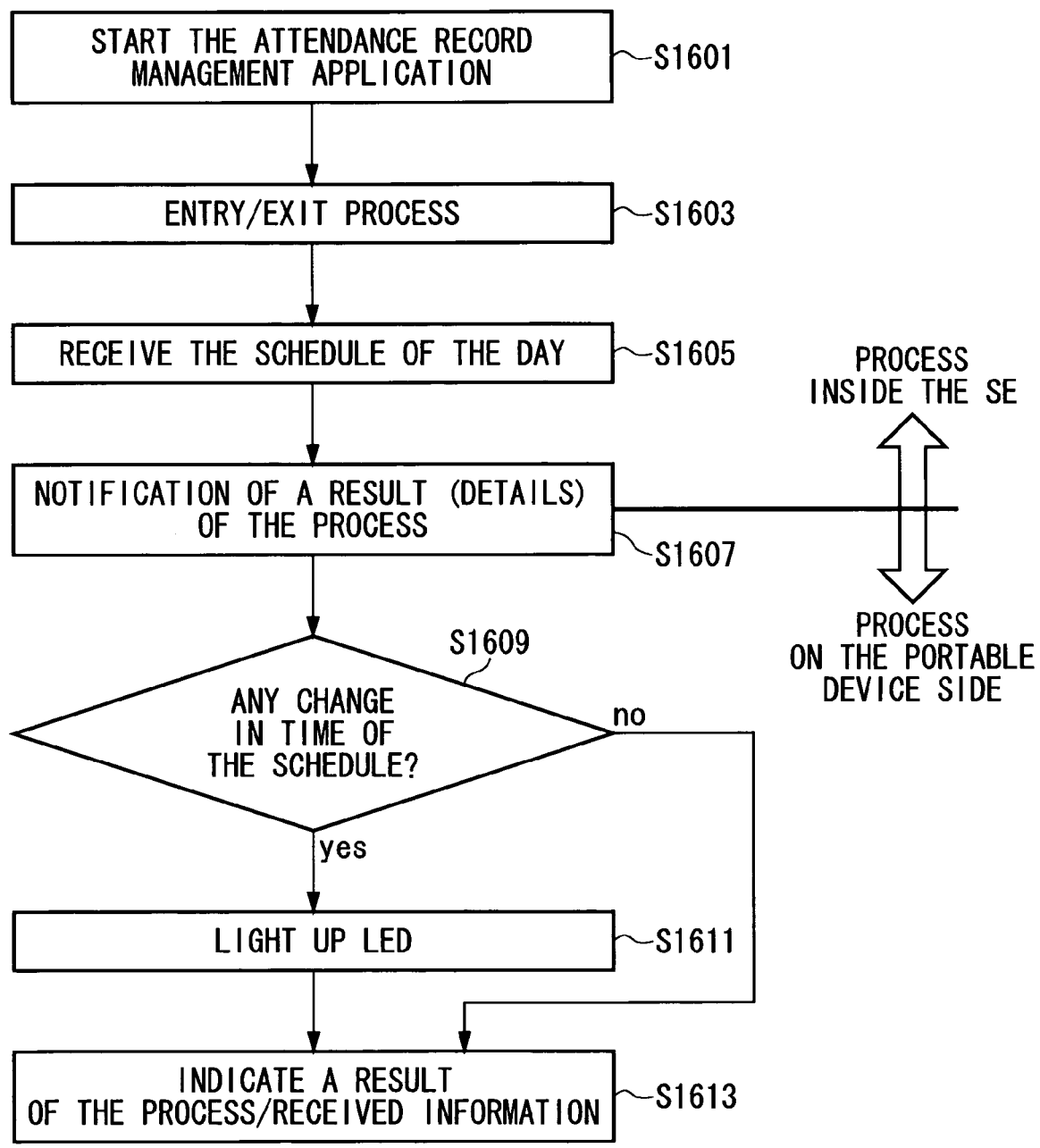
FIG. 16 is an example of operation of an SE's control section and a portable device's control section when a user is notified according to a change of a time.

Another example is a case where a user goes through an entrance/exit of a place where entry/exit management is required, such as an office or a factory. In order to go through such a place, the user needs to show that he/she is, for example, an employee of the company who is authorized to enter into the room. In such a situation, it is convenient if an attendance record, along with the entry/exit, is managed by the same application. For this purpose, an attendance record management application is to exist in the SE, and data of employees is stored there under secure protection. FIG. 16 shows an example where the process judgment section 160 of the portable device of the embodiment operates in conjunction with the control section 1102 of the SE in such a service of managing arrival at and departure from work with an employee card.

First, when a user puts the portable device mounted with the SE over a service terminal, the control section 1102 of the SE receives a command to start an attendance record management application (e.g., application 112) that corresponds to the service provided by the service terminal, and starts the attendance record management application. (S1601) Then, based on data of employees sent from the SE via contactless communication with the service terminal, the service terminal executes an entry/exit process and management of arrival at and departure from work (S1603), and a confirmed schedule of the employee on that day is sent from the service terminal to the SE as accompanying data. (S1605) This accompanying data is sent to the control section 1142 of the portable device as a result of the process or content information (S1607), and the process judgment section 160 of the portable device judges whether or not schedule information (time information, particularly here) previously written into the memory 144 of the portable device has been changed due to the accompanying data. (S1609) A case, where the time information is not written into the memory of the portable device and it is first written into due to receiving the accompanying data, is regarded the same as the case where previously written information has been changed. When judged that there has been a change, the LED or the like of the portable device is made to light up to attract a user's attention (S1611) and the process finishes, and when judged that there has not been a change, the process finishes without further action. In either judgment, the result of the attendance record management process or the accompanying data received may optionally be indicated on the display or the like of the portable device before the process finishes. (S1613)

When subjects of judgment differ depending on each application as described above, judgment methods may also be different so that the process judgment section 160 may operate differently for each application, but it can also operate for various applications in common. For example, the process judgment section 160 may operate such that it receives data before and after a process from every application of the SE; and judges whether a value has been subtracted due to a process or not by comparing figures before and after the process when the data are numerical values. When the data are character strings, it may judge whether the information of place, content, time, or the like, which guides a user to the next activity, has been changed or not by comparing character strings before and after the process. Incidentally, the process judgment section 160 can discriminate whether the data before and after the process it received are figures or character strings based on, for example, a data attribute flag or the like included in the information received from the SE. In this way, if the process judgment section 160 is made up to operate in common with its process comprising picking out a set of data before and after the process and comparing these data, a user can be notified appropriately for many applications, even in a portable device with a small processing capacity.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. An IC module for being used with a portable device, the IC module comprising:

a first memory capable of storing an application program that executes a process relating to a service provided by a service terminal via contactless communication with the service terminal, the service terminal being located at a certain place;

a second memory capable of storing a state data related to the service; and a judgment unit, separately from the application program that executes the process relating to the service, that monitors a change in a state data stored in the memory, the change having been made by the process with a user's check eliminated, and judges whether the change satisfies a condition set as requiring an attraction of a user's attention; and a control unit, separately from the application program that executes the process relating to the service, that instructs, responsive to a judgment that the condition is satisfied by the judgment unit, a user interface of the portable device to notify a user of the change.

2. The IC module according to claim 1, further comprising a unit to control so as to prevent an access to certain data of all data related to the process relating to the service and an access to a program for executing the process from an unauthorized device for the service.

3. The IC module according to claim 1, wherein
the state data related to the service comprises a data of a monetary value currently possessed by a user, whether the condition set is satisfied or not may be judged depending on whether a process which decreases the monetary value has been executed or not.

4. The IC module according to claim 1, wherein
the state data related to the service comprises a data of a monetary value currently possessed by a user, whether the condition set is satisfied or not may be judged depending on whether the monetary value has become a threshold or less as a result of the process.

5. The IC module according to claim 4, further comprising a unit to receive information about a fee for using the service via contactless communication with the service terminal, and that the threshold is determined based on the fee information received.

6. An IC card for being attached to a portable device removably and re-attachably, the IC card comprising:
    a first memory capable of storing an application program that executes a process relating to a service provided by a service terminal via contactless communication with the service terminal, the service terminal being located at a certain place;
    a second memory capable of storing a state data related to the service; and
    a judgment unit, separately from the application program that executes the process relating to the service, that monitors a change in a state data stored in the memory, the change having been made by the process with a user's check eliminated, and judges whether the change satisfies a condition set as requiring an attraction of a user's attention; and
    a control unit, separately from the application program that executes the process relating to the service, that instructs, responsive to a judgment that the condition is satisfied by the judgment unit, a user interface of the portable device to notify a user of the change.

7. The IC card according to claim 6, further comprising an interface that enables the contactless communication.

8. A portable device comprising a user interface function and IC module, the IC module comprising:
    a first memory capable of storing an application program that executes a process relating to a service provided by a service terminal via contactiess communication with the service terminal, the service terminal being located at a certain place;
    a second memory capable of storing a state data related to the service; and
    a judgment unit, separately from the application program that executes the process relating to the service, that monitors a change in a state data stored in the memory, the change having been made by the process with a user's check eliminated, and judges whether the change satisfies a condition set as requiring an attraction of a user's attention; and
    a control unit, separately from the application program that executes the process relating to the service, that instructs, responsive to a judgment that the condition is satisfied by the judgment unit, a user's interface of the portable device to notify a user of the change.

9. The portable device according to claim 8, further comprising
    an interface that enables the contactless communication between the IC module and the service terminal.

* * * * *